United States Patent
Kinomura et al.

(10) Patent No.: US 9,905,981 B2
(45) Date of Patent: Feb. 27, 2018

(54) EXTRACTION DEVICE

(75) Inventors: Shigeki Kinomura, Suntou-gun (JP); Tomoya Ono, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/384,207

(22) PCT Filed: Mar. 15, 2012

(86) PCT No.: PCT/JP2012/056638
§ 371 (c)(1),
(2), (4) Date: Sep. 10, 2014

(87) PCT Pub. No.: WO2013/136479
PCT Pub. Date: Sep. 19, 2013

(65) Prior Publication Data
US 2015/0038020 A1    Feb. 5, 2015

(51) Int. Cl.
*H01R 31/06* (2006.01)
*B60L 7/14* (2006.01)
(Continued)

(52) U.S. Cl.
CPC ............... *H01R 31/06* (2013.01); *B60L 7/14* (2013.01); *B60L 11/123* (2013.01); *B60L 11/14* (2013.01); *B60L 11/1818* (2013.01); *B60L 11/1842* (2013.01); *B60L 11/1877* (2013.01); *H01R 13/5205* (2013.01); *H01R 24/76* (2013.01); *B60L 2210/30* (2013.01);
(Continued)

(58) Field of Classification Search
CPC .. H01R 2201/26; H01R 31/06; H01R 13/703; B60L 11/1818; Y02T 90/14

USPC .................. 439/653, 35, 34, 638
See application file for complete search history.

(56) References Cited

U.S. PATENT DOCUMENTS 5,462,439 A * 10/1995 Keith .................. B60L 1/08
180/279
5,918,187 A * 6/1999 Weng .................. H01M 10/46
320/111
(Continued)

FOREIGN PATENT DOCUMENTS

JP  A-2005-235722  9/2005
JP  A-2009-278776  11/2009
(Continued)

*Primary Examiner* — Briggitte R Hammond
(74) *Attorney, Agent, or Firm* — Oliff PLC

(57) ABSTRACT

A power extraction device is an extraction device configured to extract electric power from a vehicle by being connected to a first connecting portion of the vehicle, the vehicle including a storage battery and the first connecting portion to which a plug is connected so that the first connecting portion is able to perform at least one of supplying of electric power to the storage battery and discharging of electric power accumulated in the storage battery to its outside. The extraction device includes: a second connecting portion to be connected to the first connecting portion provided on an outer peripheral surface of the vehicle; and a third connecting portion to which an external connection plug configured to connect an external device to the extraction device is connectable. The third connecting portion includes a connection surface to which the external connection plug is connected.

33 Claims, 33 Drawing Sheets

(51) Int. Cl.
  *B60L 11/12* (2006.01)
  *B60L 11/14* (2006.01)
  *B60L 11/18* (2006.01)
  *H01R 13/52* (2006.01)
  *H01R 24/76* (2011.01)
  *H01R 103/00* (2006.01)

(52) U.S. Cl.
  CPC ....... B60L 2210/40 (2013.01); B60L 2220/14 (2013.01); B60L 2250/16 (2013.01); B60L 2270/32 (2013.01); B60L 2270/34 (2013.01); H01R 2103/00 (2013.01); H01R 2201/26 (2013.01); Y02E 60/721 (2013.01); Y02T 10/6217 (2013.01); Y02T 10/7005 (2013.01); Y02T 10/705 (2013.01); Y02T 10/7072 (2013.01); Y02T 10/7077 (2013.01); Y02T 10/7241 (2013.01); Y02T 90/121 (2013.01); Y02T 90/127 (2013.01); Y02T 90/128 (2013.01); Y02T 90/14 (2013.01); Y02T 90/163 (2013.01); Y04S 10/126 (2013.01)

(56) References Cited

U.S. PATENT DOCUMENTS

| | | | | |
|---|---|---|---|---|
| 6,225,153 | B1* | 5/2001 | Neblett | B60L 11/1818 438/188 |
| 6,749,438 | B1* | 6/2004 | Scheller | B60D 1/62 439/35 |
| 8,110,743 | B2* | 2/2012 | Drane | H02G 3/14 174/152 G |
| 8,246,376 | B2* | 8/2012 | Amit | B60L 11/005 439/456 |
| 8,344,692 | B2* | 1/2013 | Sakurai | B60L 11/1811 180/65.1 |
| 8,932,065 | B2* | 1/2015 | Gerling | B60D 1/64 439/35 |
| 9,048,567 | B2* | 6/2015 | Takagi | H01R 13/6275 |
| 9,126,528 | B2* | 9/2015 | Piccioni | B60D 1/64 |
| 2008/0207034 | A1* | 8/2008 | Aita | F16L 5/025 439/277 |
| 2011/0260684 | A1* | 10/2011 | Xiaofeng | A61K 31/661 320/109 |
| 2011/0300753 | A1* | 12/2011 | Ichikawa | B60L 3/0069 439/620.21 |
| 2012/0282798 | A1* | 11/2012 | Oe | B60L 11/1816 439/369 |
| 2013/0040486 | A1* | 2/2013 | Kurumizawa | H01R 13/639 439/350 |
| 2013/0154362 | A1* | 6/2013 | Takaka | B60L 11/1818 307/9.1 |
| 2013/0314034 | A1* | 11/2013 | Ang | B60W 20/00 320/107 |
| 2014/0035527 | A1* | 2/2014 | Hayashigawa | B60L 11/1862 320/109 |
| 2015/0038020 | A1* | 2/2015 | Kinomura | H01R 24/76 439/653 |

FOREIGN PATENT DOCUMENTS

| | | |
|---|---|---|
| JP | A-2010-55836 | 3/2010 |
| JP | A-2010-55930 | 3/2010 |
| JP | A-2010-165596 | 7/2010 |
| WO | WO 2012/111081 A1 | 8/2012 |

\* cited by examiner

EXTRACTION DEVICE

TECHNICAL FIELD

The present invention relates to an extraction device.

BACKGROUND ART

There are electrically-driven vehicles such as an electric vehicle and a hybrid vehicle including, as a power source, a motor configured to receive electric power from a power storage device such as a battery and to output power for running. Among such electrically-driven vehicles, there has been known an electrically-driven vehicle including a charging inlet to which a charging connector connected to an external power supply is to be connected via a power cord in order to enable charging of a power storage device while the vehicle is parked at home or the like. For example, a vehicle described in Japanese Patent Application Publication No. 2010-165596 (JP 2010-165596 A) includes: a charging inlet to which a charging connector provided in a charging station or the like is to be connected; and a battery.

In recent years, such a system that supplies electric power in a battery provided in a vehicle to a building such as a house has attracted attention.

For example, a vehicle described in Japanese Patent Application Publication No. 2009-278776 (JP 2009-278776 A) is provided with an in-vehicle battery and a power output terminal for electric power extraction. The power output terminal is connected to a power input terminal of a building side via a connection power line. More specifically, paired connecting plugs are provided on both ends of the connection power line, and when the paired connecting plugs are inserted into the power input terminal and the power output terminal, respectively, both of the terminals are connected to each other. Hereby, electric power accumulated in the in-vehicle battery of the vehicle is supplied to the building side via the connection power line.

Further, Japanese Patent Application Publication No. 2010-55836 (JP 2010-55836 A) proposes a specific configuration of a socket device provided in a building side.

CITATION LIST

Patent Documents

Patent Document 1: Japanese Patent Application Publication No. 2010-165596 (JP 2010-165596 A)
Patent Document 2: Japanese Patent Application Publication No. 2009-278776 (JP 2009-278776 A)
Patent Document 3: Japanese Patent Application Publication No. 2010-55836 (JP 2010-55836 A)

SUMMARY OF THE INVENTION

Problem to be Solved by the Invention

However, any of the aforementioned conventional Patent Documents does not propose a specific configuration of an extraction device configured to extract electric power accumulated in a battery to its outside by being connected to a charging connecting portion of a vehicle including a battery and the charging connecting portion to which an charging plug for supplying electric power to the battery.

In the meantime, it is necessary to consider environments outside the vehicle to configure the extraction device to be connected to the charging connecting portion of the vehicle, and it is necessary to devise various structures thereof.

The present invention is accomplished in view of the above problems, and an object of the present invention is to provide an extraction device in consideration of various environments outside a vehicle.

Means for Solving the Problem

An extraction device according to the present invention is an extraction device configured to extract electric power from a vehicle by being connected to a first connecting portion of the vehicle, the vehicle including a storage battery and the first connecting portion to which a plug is connected so that the first connecting portion is able to perform at least one of supplying of electric power to the storage battery and discharging of electric power accumulated in the storage battery to its outside. The extraction device includes: a second connecting portion to be connected to the first connecting portion provided on an outer peripheral surface of the vehicle; and a third connecting portion to which an external connection plug configured to connect an external device to the extraction device is connectable. The third connecting portion includes a connection surface to which an external connection plug is connected. In a state where the extraction device is connected to the first connecting portion, that normal line of the connection surface which extends outwardly from the connection surface is inclined downward relative to a horizontal direction.

It is preferable that the extraction device include: a first body portion formed in a column shape; and a second body portion connected to the first body portion. The first body portion includes a first end provided with the second connecting portion, and a second end to which a second body portion is connected. The second body portion includes a third end connected to the second end of the first body portion, and a fourth end provided with the third connecting portion. A projection region formed by projecting the connection surface in a direction perpendicular to the connection surface from a position distanced from the connection surface passes through the first end of the first body portion.

It is preferable that the third connecting portion include: a protruding portion provided in the fourth end so as to be placed above the connection surface, and a cover provided in the fourth end so as to be rotatably placed at a position lower than the connection surface. The cover includes a fixed portion to be detachably fixed to the protruding portion. When the cover is fixed to the protruding portion, the connection surface is covered with the cover and the protruding portion.

When the cover is fixed to the protruding portion, it is preferable that a drawing hole from which a cord of the external connection plug is drawable outside be formed by the protruding portion and the cover. In a state where the cover is fixed to the protruding portion, the cover further includes a seal configured to sandwich the cord of the external connection plug connected to the connection surface.

It is preferable that the seal include a first seal provided in the protruding portion, a second seal provided in the cover so as to be placed closer to the connection surface than the drawing hole in a state where the cover is fixed to the protruding portion, and a third seal provided in the cover so as to be placed closer to the connection surface than the second seal. The first seal and the third seal are provided so that the cord of the external connection plug is sandwichable therebetween in a state where the cover is fixed to the protruding portion. The second seal includes a first slit fog used so as to extend in an opening and closing direction of the cover so that the cord is inserted therein.

It is preferable that the second seal include a plurality of second slits formed so as to extend from an edge of the first slit in a direction intersecting with the opening and closing direction of the cover.

It is preferable that: a recessed portion forming part of the drawing hole be formed in an edge of the cover; and when the cover is engaged with the protruding portion, the drawing hole be formed by the recessed portion and the protruding portion. The seal includes a fourth seal placed in the recessed portion, and a fifth seal provided in the protruding portion. The fourth seal includes a first seal piece, and a second seal piece provided closer to an opposite side to the connection surface than the first seal piece in a state where the cover is fixed to the protruding portion. The fifth seal includes a third seal piece, and a fourth seal piece provided closer to the opposite side to the connection surface than the third seal piece. In a state where the cover is engaged with the protruding portion, the first seal piece and the third seal piece are provided so that the cord is sandwichable therebetween, and the second seal piece and the fourth seal piece are provided so that the cord is sandwichable therebetween.

It is preferable that, when the cover is engaged with the protruding portion, the first seal piece make contact with the third seal piece so as to form a first insertion hole in which the cord is insertable. When the cover is engaged with the protruding portion, the second seal piece makes contact with the fourth seal piece so as to form a second insertion hole in which the cord is insertable. An aperture area of the first insertion hole is larger than an aperture area of the second insertion hole.

It is preferable that a recessed portion forming part of the drawing hole be formed in an edge of the cover. When the cover is engaged with the protruding portion, the drawing hole is formed by the recessed portion and the protruding portion. The seal includes a fourth seal placed in the recessed portion, and a fifth seal, provided in the protruding portion. The fourth seal includes a fifth seal piece, a sixth seal piece provided at that side of the fifth seal piece which is opposite to the connection surface when the cover is engaged with the protruding portion, and a seventh seal piece placed at that side of the sixth seal piece which is opposite to the fifth seal piece. The fifth seal includes an eighth seal piece, a ninth seal piece provided at that side of the eighth seal piece which is opposite to the connection surface, and a tenth seal piece provided at that side of the ninth seal piece which is opposite to the eighth seal piece.

In a state where the cover is engaged with the protruding portion, the fifth seal piece makes contact with the eighth seal piece so as to form a third insertion hole in which the cord is inserted. In a state where the cover is engaged with the protruding portion, the sixth seal piece makes contact with the ninth seal piece so as to form a fourth insertion hole in which the cord is inserted. In a state where the cover is engaged with the protruding portion, the seventh seal piece makes contact with the tenth seal piece so as to form a fifth insertion hole in which the cord is inserted. An aperture area of the third insertion hole is larger than an aperture area of the fourth insertion hole, and the aperture area of the fourth insertion hole is smaller than an aperture area of the fifth insertion hole.

It is preferable that a hole portion be formed in the cover. When a virtual line extending from the hole portion in a direction where the hole portion extends is taken as a third virtual straight line, the connection surface is provided at a position distanced from the virtual straight line.

It is preferable that a window portion through which the connection surface is observable be formed in the protruding portion. It is preferable that the extraction device further include a wall portion formed so as to extend from a lateral side position of the connection surface toward an upper side of the connection surface and to reach the other lateral side position of the connection surface.

It is preferable that the wall portion be formed so that its height from the fourth end becomes higher from the lateral side position of the connection surface toward the upper side of the connection surface.

It is preferable that the third connecting portion include a protruding portion provided above the connection surface so as to project outwardly, and a cover rotatably provided at a position upper than the connection surface. The cover includes an engagement portion to be engaged with the protruding portion. When the cover is engaged with the protruding portion, the connection surface is covered with the cover and the protruding portion.

It is preferable that the extraction device include: a third body portion formed in a column shape; and a fourth body portion connected to the third body portion. The third body portion includes a fifth end provided with the second connecting portion, and a sixth end to which the fourth body portion is connected, and the fourth body portion includes a seventh end connected to the fourth body portion, and a sixth end provided with the third connecting portion. In a state where the second connecting portion is connected to the first connecting portion, the fourth body portion extends downward from the fifth end toward the sixth end.

Advantageous Effects of Invention

According to the extraction device of the present invention, it is possible to provide an extraction device usable successfully even under various environments.

BRIEF DESCRIPTION OF THE DRAWINGS

FIG. 40 is a side view illustrating a second modified embodiment of the power extraction device 30 according to Embodiment 4.

FIG. 49 is a schematic view schematically illustrating a seal 43 and so on.

MODES FOR CARRYING OUT THE INVENTION

With reference to FIGS. 1 to 49, the following describes a cable receiving device and a vehicle according to embodiments of the present invention. The following embodiments deal with an example in which the present invention is applied to a so-called hybrid vehicle, but it goes without saying that the present invention is also applicable to an electric vehicle.

Embodiment 1

Figure 1:
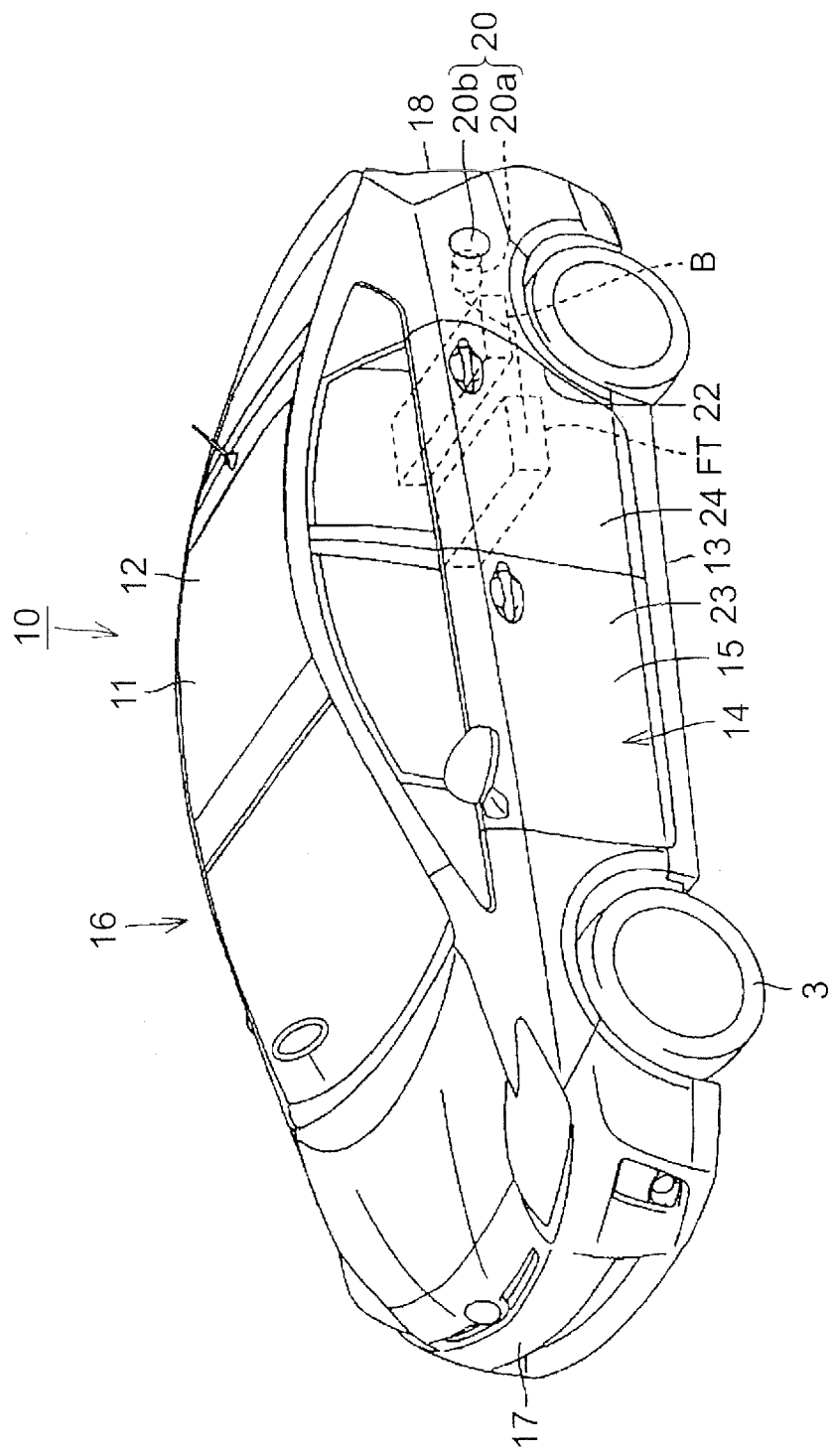
FIG. 1 is a left-side perspective view illustrating a vehicle 10.
Figure 2:
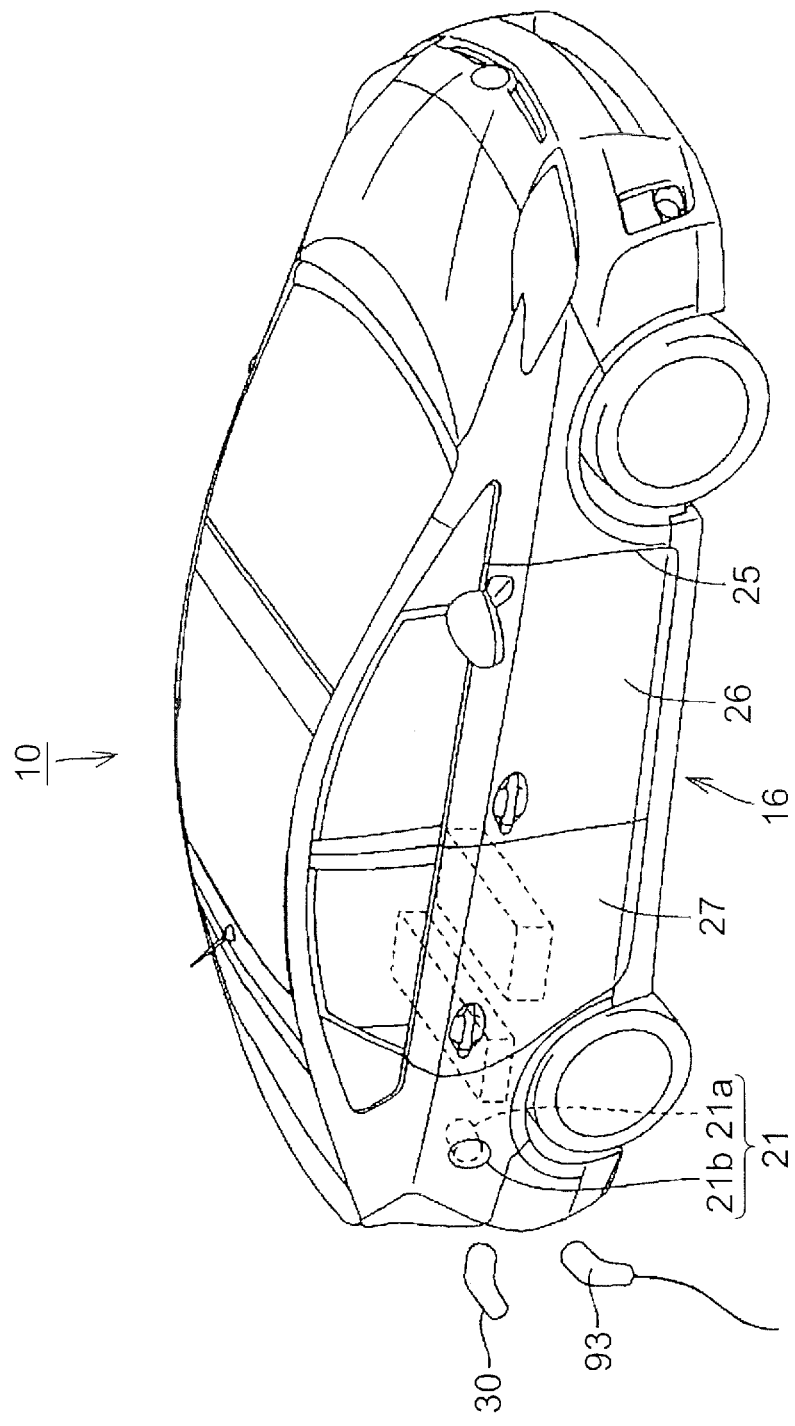
FIG. 2 is a right-side perspective view of the vehicle 10 illustrated in FIG. 1.

FIG. 1 is a left-side perspective view illustrating a vehicle 10, and FIG. 2 is a right-side perspective view of the vehicle 10 illustrated in FIG. 1.

In FIG. 1, the vehicle 10 includes: a body 11 forming a contour of the vehicle 10; and a fuel tank FT and a battery B accommodated in the body 11.

A surface of the body 11 includes a top surface 12, a bottom surface 13, and a peripheral surface 14, and the peripheral surface 14 includes a side surface 15 and a side surface 16, a front surface 17, and a back surface 18.

In FIGS. 1 and 2, an entrance opening portion 22 is formed on the side surface 15, and the body 11 includes a door 23 and a door 24 configured to open and close the entrance opening portion 22. Note that, in examples illustrated in FIGS. 1 and 2, a driver seat is placed not on a side-surface-15 side but on a side-surface-16 side, and the driver seat is provided with an operating portion such as a steering wheel for operating the vehicle 10.

The side surface 15 is provided with a fuel filling portion 20 and a charging portion 21. The fuel filling portion 20 is provided on the peripheral surface 14, and is placed on a rear side relative to the entrance opening portion 22. The charging portion 21 is provided on the side surface 16, and is placed on the rear side relative to the entrance opening portion 22. Note that a mounting position of the charging portion 21 is not limited to the side surface 15. For example, the charging portion 21 can be provided on the front surface, the back surface, the top surface, or the like of the vehicle 10. Note that the top surface may be an engine roof or the like.

The fuel filling portion 20 is provided with a nozzle insertion portion 20a into which a nozzle portion of a fuel filling nozzle provided outside is inserted, and a cover portion 20*b* provided on the body 11. When the cover portion 20*b* is opened, an opening of the nozzle insertion portion 20*a* is exposed outside, so that the nozzle of the fuel filling nozzle can be inserted into the nozzle insertion portion 20*a*.

The nozzle insertion portion 20*a* is connected to the fuel tank FT, and a fuel supplied from the nozzle insertion portion 20*a* is supplied to the fuel tank FT. Note that, in a vehicle including an internal combustion engine, the fuel to be supplied may be gasoline, LP gas (Liquefied petroleum gas), or the like. Further, in a vehicle including a fuel cell, the fuel to be supplied may be liquid hydrogen, ethanol, or the like.

The charging portion 21 includes a charging connector 21*a* to which a charging plug 93 provided outside is to be attached, and a cover portion 21*b* provided on the body 11. When the cover portion 21*b* is opened, the charging connector 21*a* is exposed outside, so that the charging plug 93 is attachable to the charging connector 21*a*.

Electric power supplied from the charging connector 21*a* is supplied to the battery B via the charging connector 21*a*, a transducer, or the like.

In FIG. 2, an entrance opening portion 25 is formed on the side surface 16, and the body 11 is provided with a door 26 and a door 27 configured to open and close the entrance opening portion 25.

Figure 3:
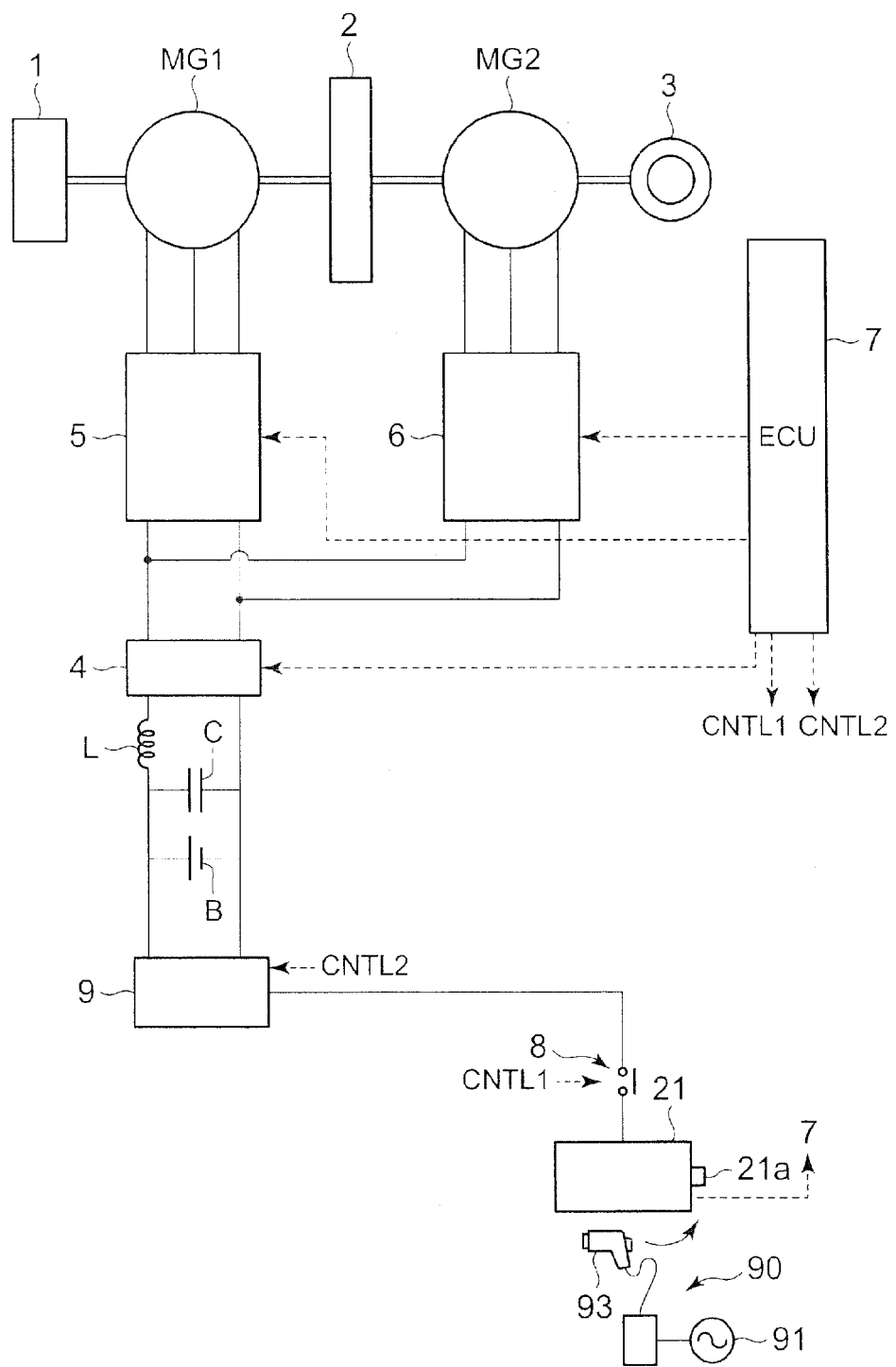
FIG. 3 is a block diagram illustrating the vehicle 10.

FIG. 3 is a block diagram illustrating the vehicle 10. The vehicle 10 includes an engine 1, motor generators MG1, MG2, a power distribution mechanism 2, the battery B, a capacitor C, a reactor L, a converter 4, an inverter 5 and an inverter 6, a vehicle ECU (Electronic Control Unit) 7, a switching element 8 such as a relay, a transducer 9, and the charging portion 21.

The power distribution mechanism 2 is connected to the engine 1 and the motor generators MG1, MG2, so as to distribute power to them. For example, a planet gear mechanism having three rotating shafts, i.e., a sun gear, a planetary carrier, and a ring gear, is used as the power distribution mechanism 2. The three rotating shafts are connected to respective rotating shafts of the engine 1 and the motor generators MG1, MG2. For example, a rotor of the motor generator MG1 is hollowed, so that a crank shaft of the engine 1 is inserted into a center thereof. Thus, the engine 1 and the motor generators MG1, MG2 are mechanically connected to the power distribution mechanism 2.

Note that the rotating shaft of the motor generator MG2 is connected to front wheels 3, which are driving wheels, via a reducing gear and a differential gear (not shown). The reduction gear to the rotating shaft of the motor generator MG2 may be further incorporated inside the power distribution mechanism 2.

The motor generator MG1 works as a generator driven by the engine 1, and is incorporated in the vehicle 10 as a member working as an electric motor that can start the engine 1. The motor generator MG2 is incorporated in the vehicle 10 as an electric motor configured to drive the front wheels 3, which are driving wheels of the vehicle 10.

The motor generators MG1, MG2 are three-phase alternating synchronous motors, for example. The motor generators MG1, MG2 each include, as a stator coil, a three-phase coil including a U-phase coil, a V-phase coil, and a W-phase coil.

The motor generator MG1 generates a three-phase alternating voltage by use of an engine output, and outputs the three-phase alternating voltage thus generated to the inverter 5. The motor generator MG1 generates a driving force by a three-phase alternating voltage received from the inverter 5, so as to start the engine 1.

The motor generator MG2 generates a driving torque of the vehicle by a three-phase alternating voltage received from the inverter 6. At the time of regenerative brake of the vehicle, the motor generator MG2 generates a three-phase alternating voltage and outputs it to the inverter 6.

The switching element 8 is placed between the charging portion 21 and the transducer 9. The switching element 8 connects the charging portion 21 to the transducer 9, and disconnects the charging portion 21 from the transducer 9. The transducer 9 is controlled to be driven according to a control signal CNTL2 from the vehicle ECU7. The switching element 8 is switched between ON and OFF according to the control signal CNTL2 from the vehicle ECU7.

When the charging plug 93 is connected to the charging connector 21*a* of the charging portion 21 to charge the battery B, the vehicle ECU 7 turns on the switching element 8 to connect the charging portion 21 to the transducer 9. Then, the vehicle ECU 7 drives the transducer 9 to convert an alternating-current power supplied from an external power supply 91 into a direct-current power.

Figure 4:
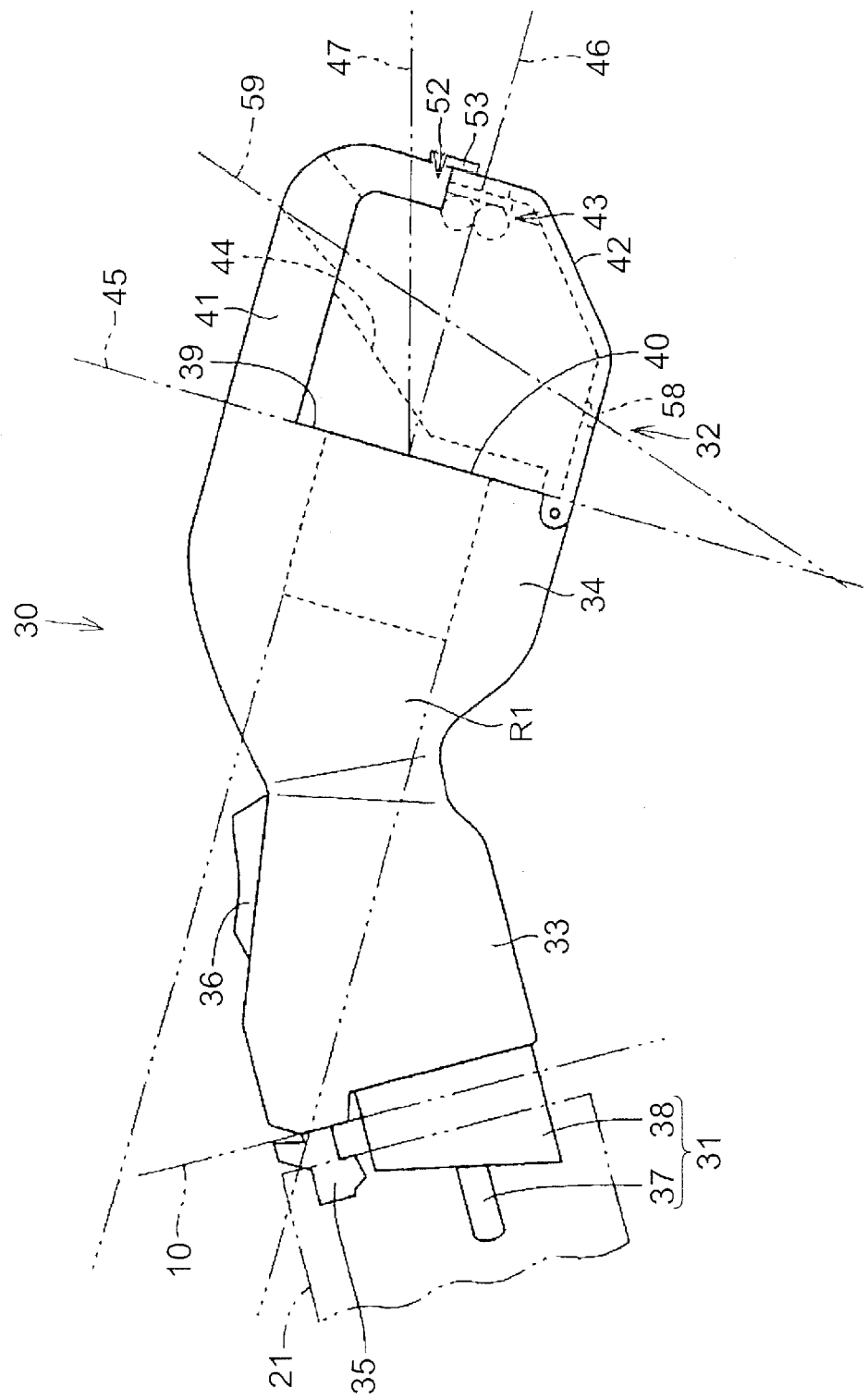
FIG. 4 is a side view illustrating a power extraction device 30.

FIG. 4 is a side view illustrating a power extraction device 30. The power extraction device 30 is a device connected to the charging portion 21 illustrated in FIG. 2 to extract electric power accumulated in the battery B. An electric plug of a device such as rice cooker is connectable to the power extraction device 30, and an electric apparatus such as the rice cooker can be driven by electric power from the battery B.

In FIG. 4, the power extraction device 30 includes a body portion 33 formed in a column shape and a body portion 34 connected to the body portion 33. The body portion 33 includes: a connecting portion 31 provided in one end of the body portion 33 and connected to the charging portion 21 of the vehicle 10; a claw portion 35 hooked onto a recessed portion formed in the charging portion 21; and a switch 36 configured to disengage an engaged state between the claw portion 35 and the charging portion 21.

The connecting portion 31 includes: a terminal portion 37 connected to a terminal portion provided in the charging portion 21; and a tubular portion 38 fitted to an annular groove provided around the charging portion 21.

One end of the body portion 34 is connected to the other end of the body portion 33. The body portion 34 includes a connecting portion 32 provided in the other end of the body portion 34 and configured such that an electric plug of an external electric apparatus is connected thereto.

The connecting portion 32 includes: an end surface 39 formed in an end of the body portion 34; a connection surface 40 formed on the end surface 39 so that an electric plug is connected thereto; a protruding portion 41 provided above the connection surface 40; a cover 42 rotatably supported by a part at a position lower than the connection surface 40; a seal 43; and a loop wall portion 44.

A projection region R formed by projecting the connection surface 40 in a direction perpendicular to the connection surface 40 from a position away from the connection surface 40 passes through that end of the body portion 33 at which the connecting portion 31 is provided.

At least part of the connection surface 40 and at least part of the connecting portion 31 are formed so as to overlap each other horizontally in a state where the power extraction device 30 is connected to the charging portion 21.

A terminal hole into which a terminal of an electric plug to be connected is inserted is formed on the connection surface 40. Here, in a state where the power extraction device 30 is connected to the charging portion 21 of the vehicle 10, a virtual plane extending along the connection surface 40 is taken as a virtual plane 45.

In a state where the power extraction device 30 is connected to the charging portion 21, a straight line passing through the connection surface 40 and perpendicular to the virtual plane 45 is taken as a virtual straight line 46. In a state where the power extraction device 30 is connected to the charging portion 21, a virtual straight line passing through the connection surface 40 and extending horizontally is taken as a virtual straight line 47. As the virtual straight line 46 goes away from the connection surface 40, the virtual straight line 46 extends toward a downward direction relative to the virtual straight line 47. Thus, the connection surface 40 is placed in an inclined manner. As described above, the virtual straight line 47 is a virtual line extending horizontally, and a virtual line extending horizontally regardless of a connection posture of the power extraction device 30.

For example, in a case where the power extraction device 30 is used outdoors in the rain, since the connection surface 40 is placed in an inclined manner as described above, it is possible to restrain rain water from being attached to the connection surface 40.

Figure 5:
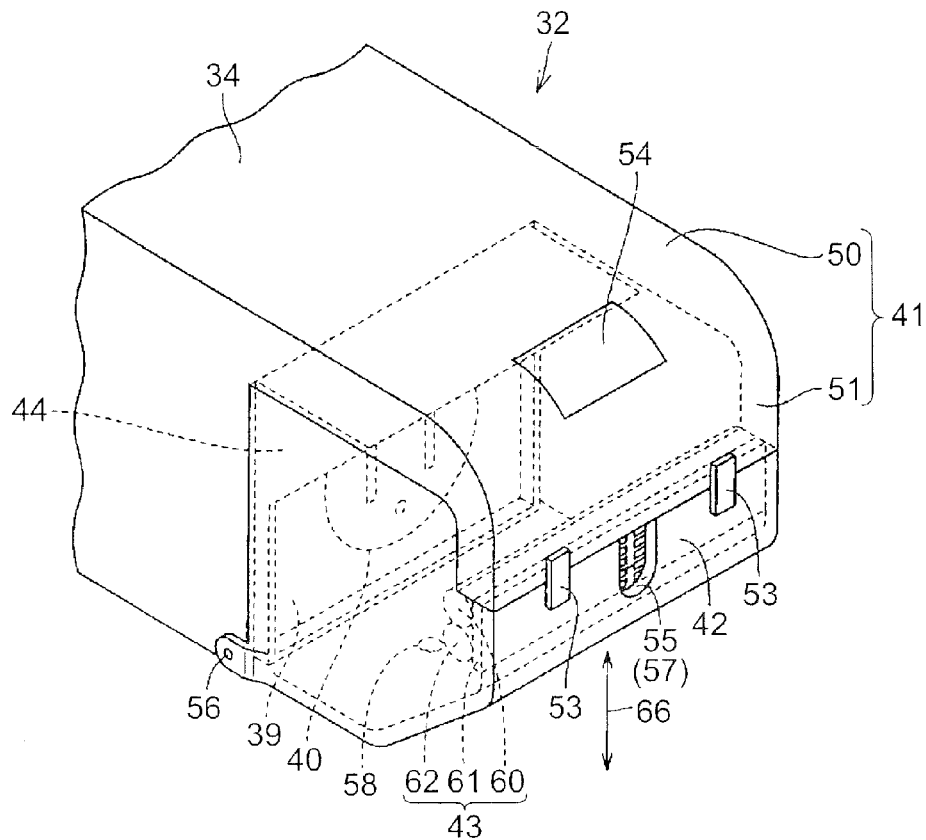
FIG. 5 is a perspective view illustrating a connecting portion 32.

FIG. 5 is a perspective view illustrating the connecting portion 32. As illustrated in FIG. 5, the protruding portion 41 is formed in a shape of eaves. The protruding portion 41 includes an upper wall portion 50, and a suspended portion 51 extending downward from a forefront part of the upper wall portion 50. A window portion 54 is formed in the upper wall portion 50, so that a user is able to see the connection surface 40 from above. Note that an engagement groove is formed in the suspended portion 51.

The cover 42 is rotatably provided in a shaft portion 56 formed in the body portion 34. The shaft portion 56 is formed below the connection surface 40. The cover 42 includes an engagement portion 53 engaged with the engagement groove formed in the suspended portion 51. When the cover 42 is engaged with the protruding portion 41, the connection surface 40 is covered with the protruding portion 41 and the cover 42. This makes it possible to restrain rain water or the like foreign matters from being attached to the connection surface 40.

A recessed portion 55 is faulted in an edge of the cover 42, and a scupper hole 58 is formed in the cover 42. When the cover 42 is engaged with the protruding portion 41, a drawing hole 57 from which a cord of an electric plug is drawable is formed by the recessed portion 55 and the protruding portion 41.

The scupper hole 58 is formed on a bottom part of the cover 42, and serves as a hole from which foreign substances such as water getting through the cover 42 is discharged outside. Here, in FIG. 4, when a virtual straight line extending from the scupper hole 58 in a direction where the scupper hole 58 extends is taken as a virtual straight line 59, the connection surface 40 is provided at a position away from the virtual straight line 59. That is, the scupper hole 58 is formed so that the virtual straight line 59 does not pass through the connection surface 40.

As illustrated in FIG. 4, in a state where the cover 42 is closed, even if scattered rain water comes inside the cover 42 through the scupper hole 58, it is possible to restrain the rain water or the like foreign matters from being attached to the connection surface 40.

In FIG. 5, the seal 43 includes a seal 60 provided on a bottom end surface of the suspended portion 51, a seal 61 provided in the cover 42, and a seal 62 provided in the cover 42. The seal 60 is formed in an elongated shape. Note that an air gap may be formed within the seal 60 formed in a column shape.

The seal 61 is provided on an inner side of the cover 42 at a position adjacent to the recessed portion 55.

The seal 62 is provided on that side of the seal 61 which is opposite to the recessed portion 55. Accordingly, in a state where the cover 42 is engaged with the protruding portion 41, the seal 61 is provided so as to adjacent to a connection-surface-40 side of the drawing hole 57. In a state where the cover 42 is engaged with the protruding portion 41, the seal 62 is placed closer to the connection surface 40 than the seal 61.

In a state where the cover 42 is engaged with the protruding portion 41, the seal 62 makes contact with the seal 60.

Figure 6:
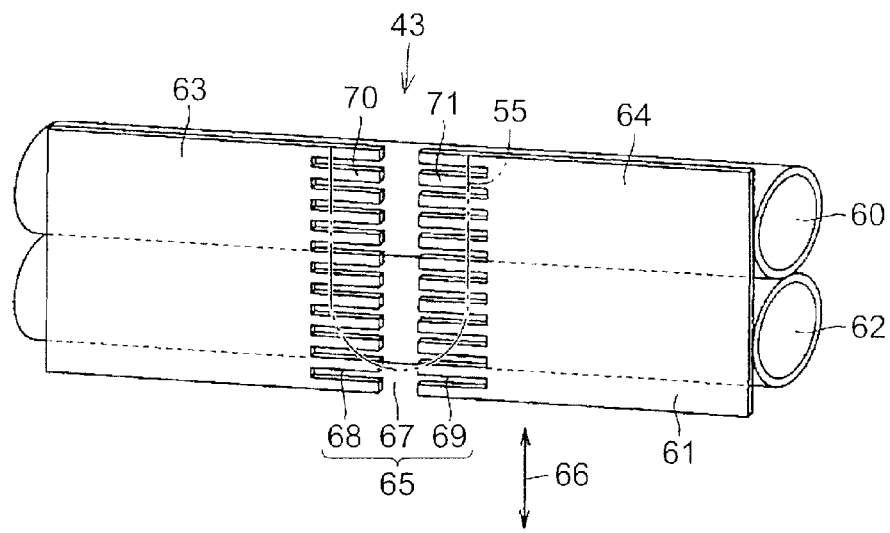
FIG. 6 is a perspective view illustrating a seal 43 in a state where a cover 42 is engaged with a protruding portion 41.

FIG. 6 is a perspective view illustrating the seal 43 in a state where the cover 42 is engaged with the protruding portion 41. As illustrated in FIG. 6, when the cover 42 is engaged with the protruding portion 41, the seal 60 makes contact with the seal 62.

A slit portion 65 is formed in the seal 61, and due to the slit portion 65, the seal 61 is divided into a seal piece 63 and a seal piece 64.

The slit portion 65 includes a slit portion 67 extending in an opening and closing direction 66 of the cover 42, a slit portion 68 formed in the seal piece 63, and a slit portion 69 formed in the seal piece 64.

The slit portion 68 is formed so as to extend from an edge of the slit portion 67 in a direction intersecting with the opening and closing direction 66. Note that a plurality of slit portions 68 is formed in the seal piece 63 at intervals in the opening and closing direction 66. Hereby, a plurality of piece portions 70 is formed in the edge of the slit portion 67 of the seal piece 63 at intervals in the opening and closing direction 66.

The slit portion 69 is formed so as to extend from the edge of the slit portion 67 in the direction intersecting with the opening and closing direction 66. Note that a plurality of slit portions 69 is formed in the seal piece 64 at intervals in the opening and closing direction 66. Hereby, a plurality of piece portions 71 is formed in the edge of the slit portion 67 of the seal piece 64 at intervals in the opening and closing direction 66.

Figure 7:
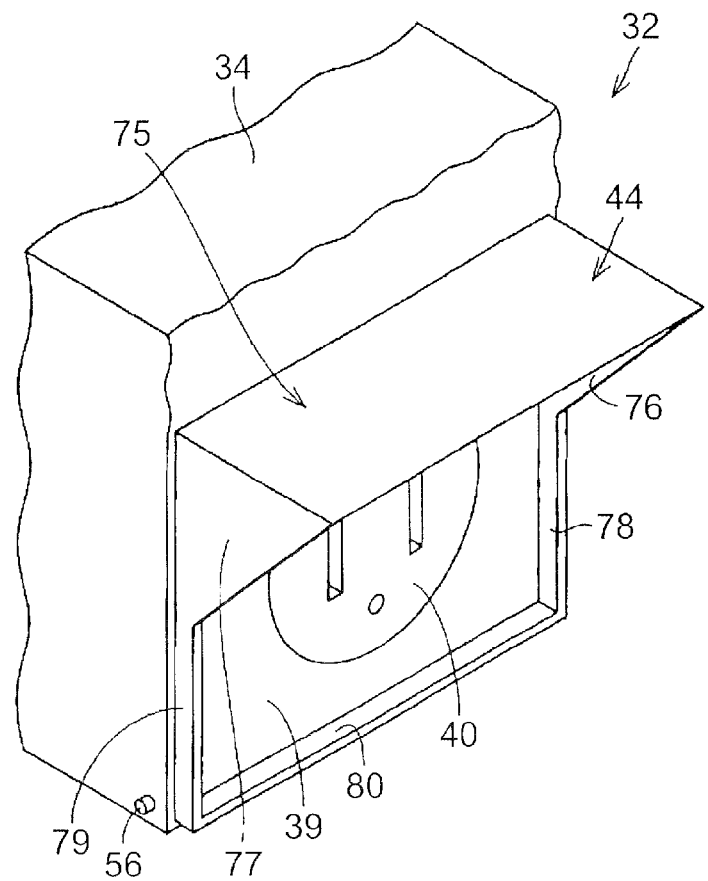
FIG. 7 is a perspective view illustrating the connecting portion 32 in which the protruding portion 41 and the cover 42 are omitted.

FIG. 7 is a perspective view illustrating the connecting portion 32 in which the protruding portion 41 and the cover 42 are omitted. As illustrated in FIG. 7, the loop wall portion 44 includes: a top plate portion 75 provided above the connection surface 40 and protruding outwardly; a side wall portion 76 and a side wall portion 77 extending upward from respective positions laterally distanced from the connection surface 40; and frame portions 78, 79, 80.

The side wall portion 76 is formed to hang downward from one end of the top plate portion 75, and the side wall portion 77 is formed to hang downward from the other end of the top plate portion 75. The side wall portions 76, 77 are formed such that their heights (heights from the end surface 39) become higher as the side wall portions 76, 77 go toward the top plate portion 75 from lateral sides of the connection surface 40.

The frame portion 78 is formed to extend downward from a lower end of the side wall portion 76. The frame portion 79 is also formed to extend downward from a lower end of the side wall portion 77. The frame portion 80 is formed to extend along a lower hem portion of the end surface 39, and the frame portion 80 connects a lower end of the frame portion 78 to a lower end portion of the frame portion 79.

Since the loop wall portion 44 is formed in a loop shape as such, even if the power extraction device 30 is used under an environment such as rain; it is possible to restrain rain water or the like foreign matters from being attached to the connection surface 40.

Further, since the side wall portion 76 and the side wall portion 77 having a high height, even if rain or the like is blown thereto in a diagonal direction, it is possible to restrain the rain water or the like foreign matters from being attached to the connection surface 40.

Figure 8:
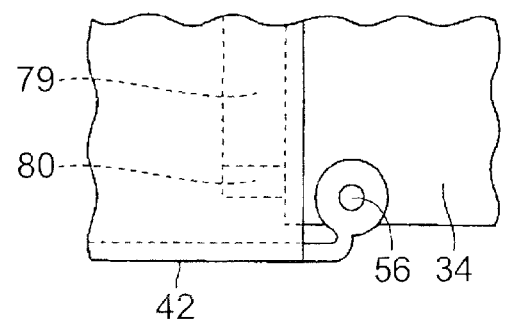
FIG. 8 is a side view schematically illustrating a vicinity of a lower end of the connecting portion 32.

FIG. 8 is a side view schematically illustrating a vicinity of a lower end of the connecting portion 32. As illustrated in FIG. 8, even in a state where the cover 42 is closed, a slight gap is formed between a lower end of the body portion 34 and the cover 42. In the meantime, since the frame portion 80 is provided along the lower hem portion of the end surface 39, even if rain water or the like foreign substances comes inside, it is possible to restrain the rain water from being attached to the connection surface 40 illustrated in FIG. 7.

Figure 9:
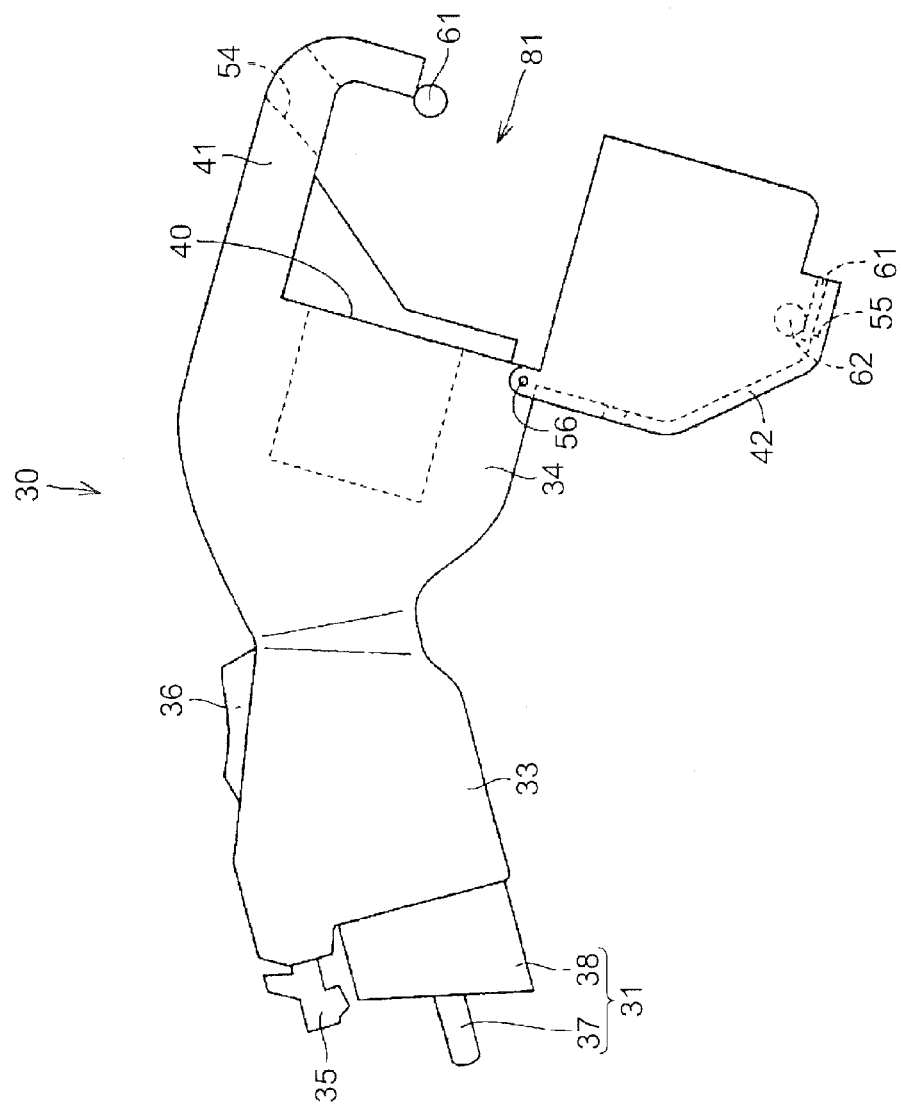
FIG. 9 is a side view of the power extraction device 30 in a state where an engaged state between the cover 42 and the protruding portion 41 is disengaged and the cover 42 is opened.

FIG. 9 is a side view of the power extraction device 30 in a state where an engaged state between the cover 42 and the protruding portion 41 is disengaged and the cover 42 is opened. As illustrated in FIG. 9, when the cover 42 is opened, an opening 81 through which an electric plug is inserted is formed.

The following describes a method of use of the power extraction device 30 thus configured.

Figure 10:
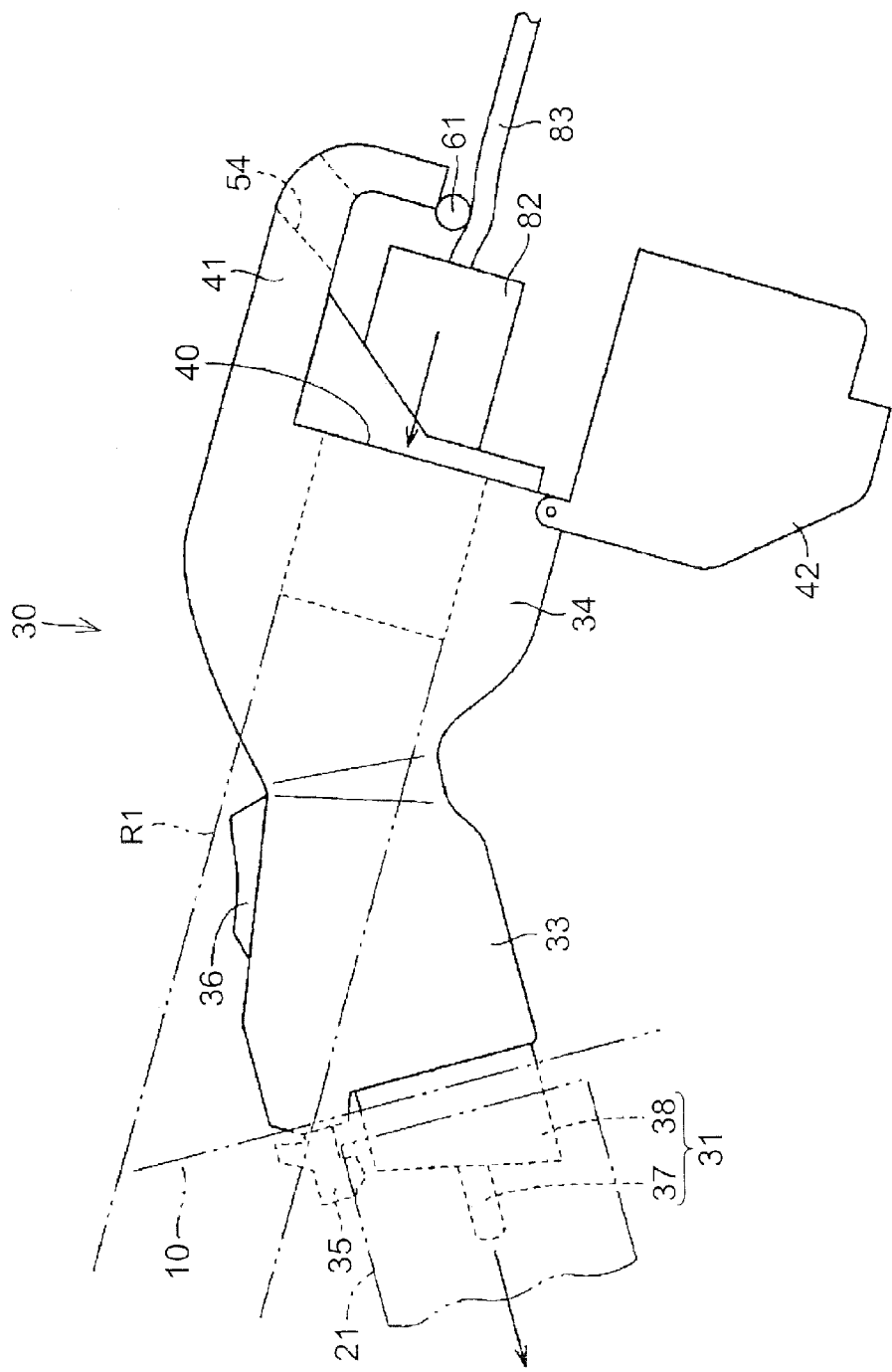
FIG. 10 is a side view of the power extraction device 30 in a state where the power extraction device 30 is connected to a charging portion 21 of the vehicle 10.

FIG. 10 is a side view of the power extraction device 30 in a state where the power extraction device 30 is connected to the charging portion 21 of the vehicle 10. In FIG. 10, the connecting portion 31 is connected to the charging portion 21. After that, the cover 42 is opened, and the electric plug 82 is connected to the connection surface 40.

When the electric plug 82 is connected to the connection surface 40, the user applies a pressing force thereto in a direction perpendicular to the connection surface 40. The pressing force applied to the power extraction device 30 is supported by a connection part between the end of the body portion 33 and the vehicle 10.

Figure 11:
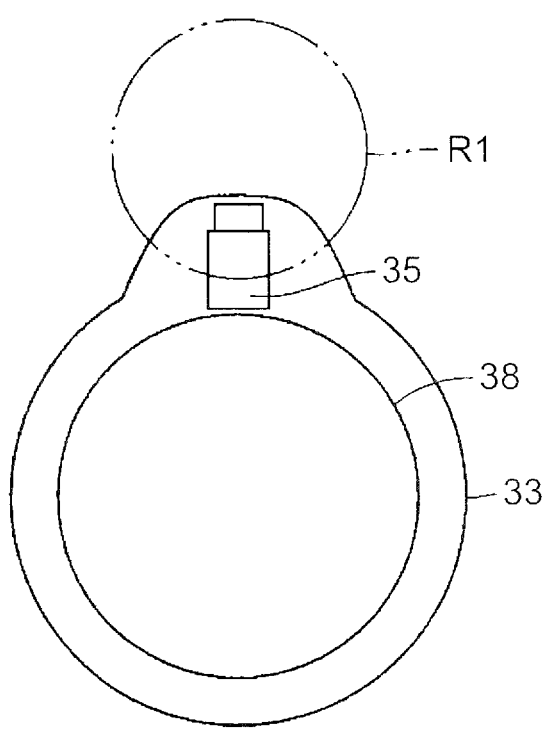
FIG. 11 is a schematic view schematically illustrating a positional relationship between an end of a body portion 33 and a projection region R1.

Here, a region where the connection surface 40 is projected in a direction perpendicular to the connection surface 40 from a position apart from the connection surface 40 is taken as a projection region R1. The projection region R1 passes through that end of the body portion 33 at which the connecting portion 31 is provided. FIG. 11 is a schematic view schematically illustrating a positional relationship between the end of the body portion 33 and the projection region R1. As illustrated in FIG. 11, the projection region R and the end of the body portion 33 overlap with each other.

Because of this, a rotation moment added to the connection part between an end of the power extraction device 30 and the vehicle 10 is reduced due to the pressing force applied by the user. This makes it possible to restrain the forefront part of the power extraction device 30, the charging portion 21 of the vehicle 10, and the like from being damaged.

Figure 12:
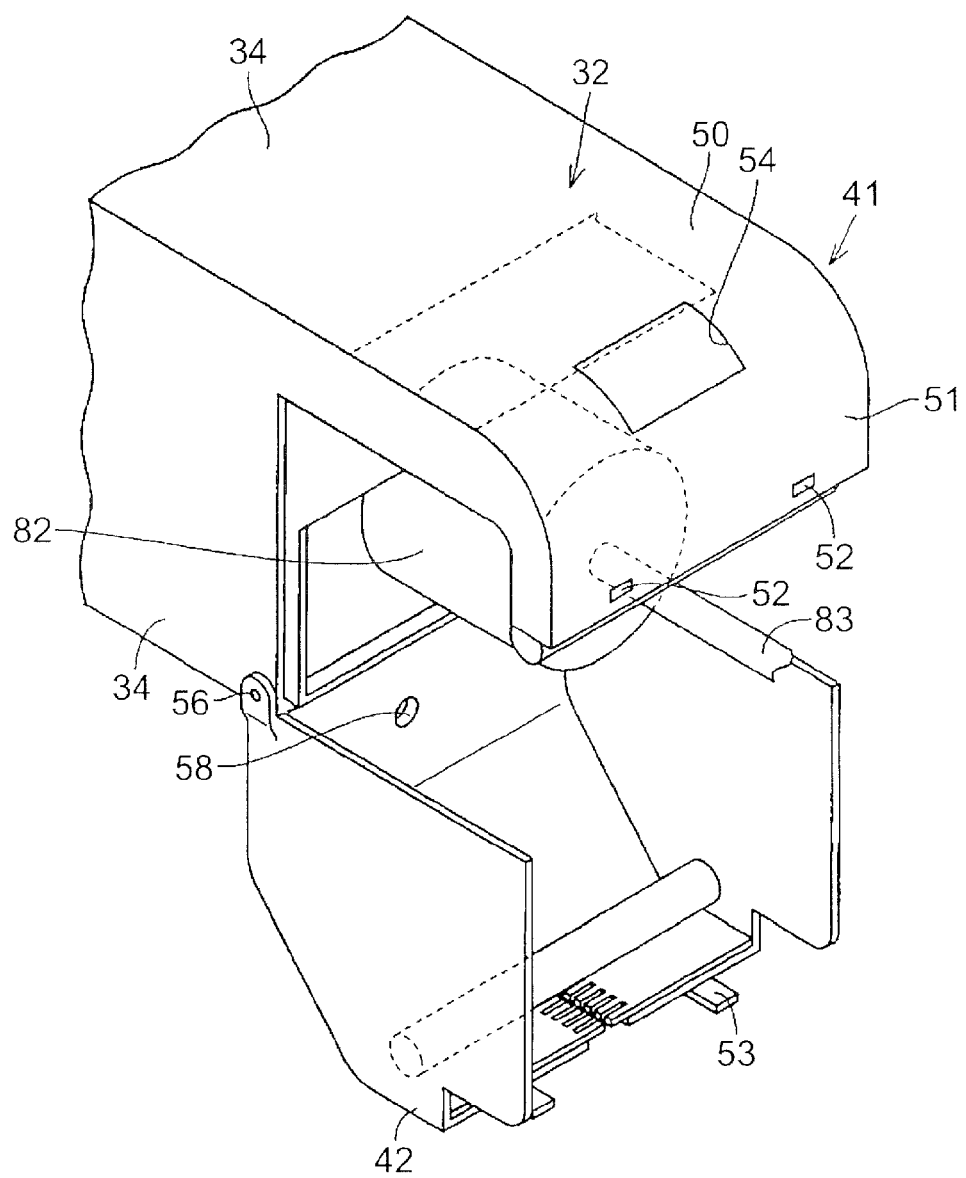
FIG. 12 is a perspective view illustrating the connecting portion 32 and its vicinal area in a state where an electric plug 82 is connected to a connection surface 40.

FIG. 12 is a perspective view illustrating the connecting portion 32 and its vicinal area in a state where the electric plug 82 is connected to the connection surface 40. As illustrated in FIG. 12, the window portion 54 is formed in the upper wall portion 50 of the protruding portion 41. Accordingly, when the electric plug 82 is attached, the user is able to attach the electric plug 82 to the connection surface 40 while checking the connection surface 40 and the electric plug 82.

Figure 13:
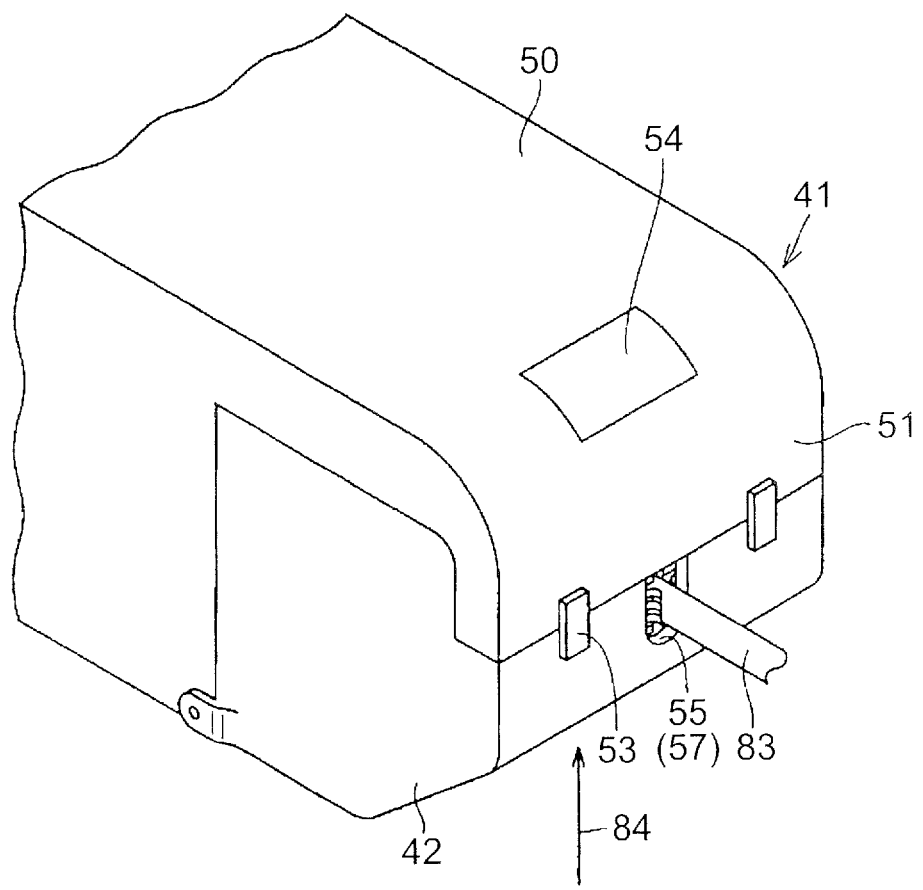
FIG. 13 is a perspective view illustrating a state where the cover 42 is closed from the state illustrated in FIG. 12.

FIG. 13 is a perspective view illustrating a state where the cover 42 is closed from the state illustrated in FIG. 12. As illustrated in FIG. 13, the cover 42 is rotated in a closing direction 84, so as to hook the engagement portion 53 to an engagement groove 52 formed in the protruding portion 41. Hereby, the cover 42 is fixed to the suspended portion 51.

When the cover 42 is fixed to the suspended portion 51, the electric plug 82 and the connection surface 40 illustrated in FIG. 12 are covered with the cover 42 and the protruding portion 41, thereby making it possible to restrain rain water or the like foreign matters from coming inside the cover 42. The cord 83 is drawn outside from the drawing hole 57.

Figure 14:
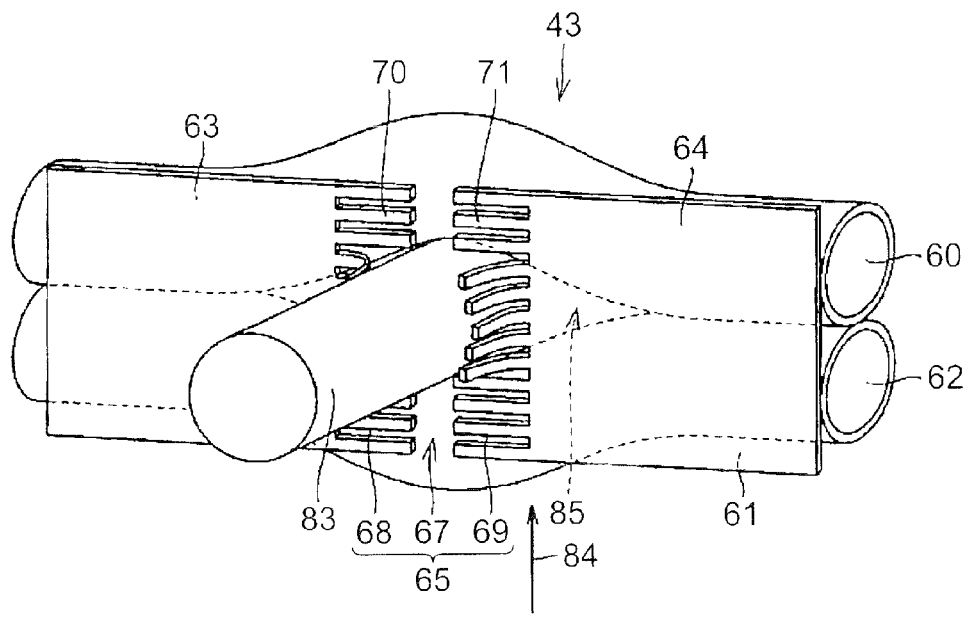
FIG. 14 is a perspective view illustrating seals 60, 61, 63, and a cord 83 in a state where the cover 42 is fixed to the protruding portion 41 as illustrated in FIG. 13.

FIG. 14 is a perspective view illustrating the seals 60, 61, 63, and the cord 83 in a state where the cover 42 is fixed to the protruding portion 41 as illustrated in FIG. 13. As illustrated in FIG. 14, when the cover 42 is rotated in the closing direction 84, the seal 61 and the seal 62 provided in the cover 42 are also displaced in the closing direction 84. Part of the seal 62 makes contact with the seal 60, and the cord 83 is sandwiched between the seal 60 and the seal 62. Further, the cord 83 comes inside the seal 61 from the slit portion 67.

Figure 15:
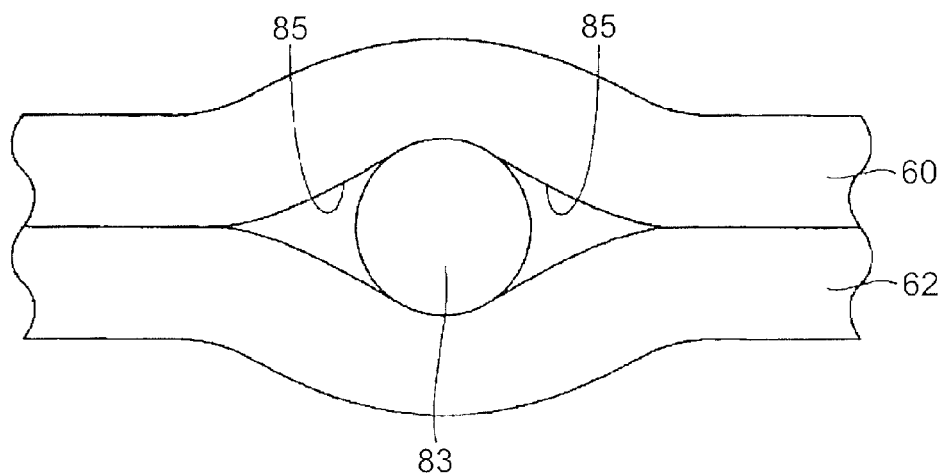
FIG. 15 is a front view illustrating the seal 60, a seal 62, and the cord 83 illustrated in FIG. 14.

FIG. 15 is a front view illustrating the seal 60, the seal 62, and the cord 83 illustrated in FIG. 14. As illustrated in FIG. 15, when the cord 83 is sandwiched between the seal 60 and the seal 61, gaps 85 are formed on lateral sides of the cord 83 by the cord 83, the seal 60, and the seal 62.

As illustrated in FIG. 14, the plurality of piece portions 70 is formed in the seal piece 63 of the seal 61, and the plurality of piece portions 71 is also formed in the seal 61. When the cord 83 comes inside the slit portion 67, the piece portions 70 and the piece portions 71 are pushed out by the cord 83, so that the piece portions 70, 71 make contact with the cord 83.

Accordingly, the gaps 85 formed on the lateral sides of the cord 83 are covered with the plurality of piece portions 70, 71 placed on the lateral sides of the cord 83.

As a result, as illustrated in FIG. 13, in a state where the cover 42 is fixed to the suspended portion 51, it is possible to restrain rain water or the like foreign matters from coming inside the cover 42 from the drawing hole 57.

As such, according to the power extraction device 30 of Embodiment 1, when the power extraction device 30 is used, it is possible to restrain rain water or the like foreign matters from coming inside the cover 42.

Further, even if rain water or the like comes inside the cover 42, it is possible to discharge outside the rain water or the like foreign matters from the scupper hole 58 illustrated in FIG. 4. Note that the vehicle 10 according to Embodiment 1 deals with an example in which the power extraction device 30 is connected to the charging portion 21 configured to cause the battery B to receive electric power. However, the vehicle 10 is not limited to this. For example, the charging portion 21 may have a function as a discharge portion to discharge electric power accumulated in the battery B to outside. In view of this, the charging portion 21 is a connecting portion having at least one of a function to charge electric power to the battery B, and a function to discharge electric power accumulated in the battery B to its outside.

Embodiment 2

With reference to FIGS. 16 to 33, the following describes a power extraction device 30 according to Embodiment 2.

Note that, among constituents illustrated in FIGS. 16 to 33, a constituent the same as or equivalent to a constituent as illustrated in FIGS. 1 to 15 has the same reference sign as in FIGS. 1 to 15, and a description thereof may be omitted.

Figure 16:
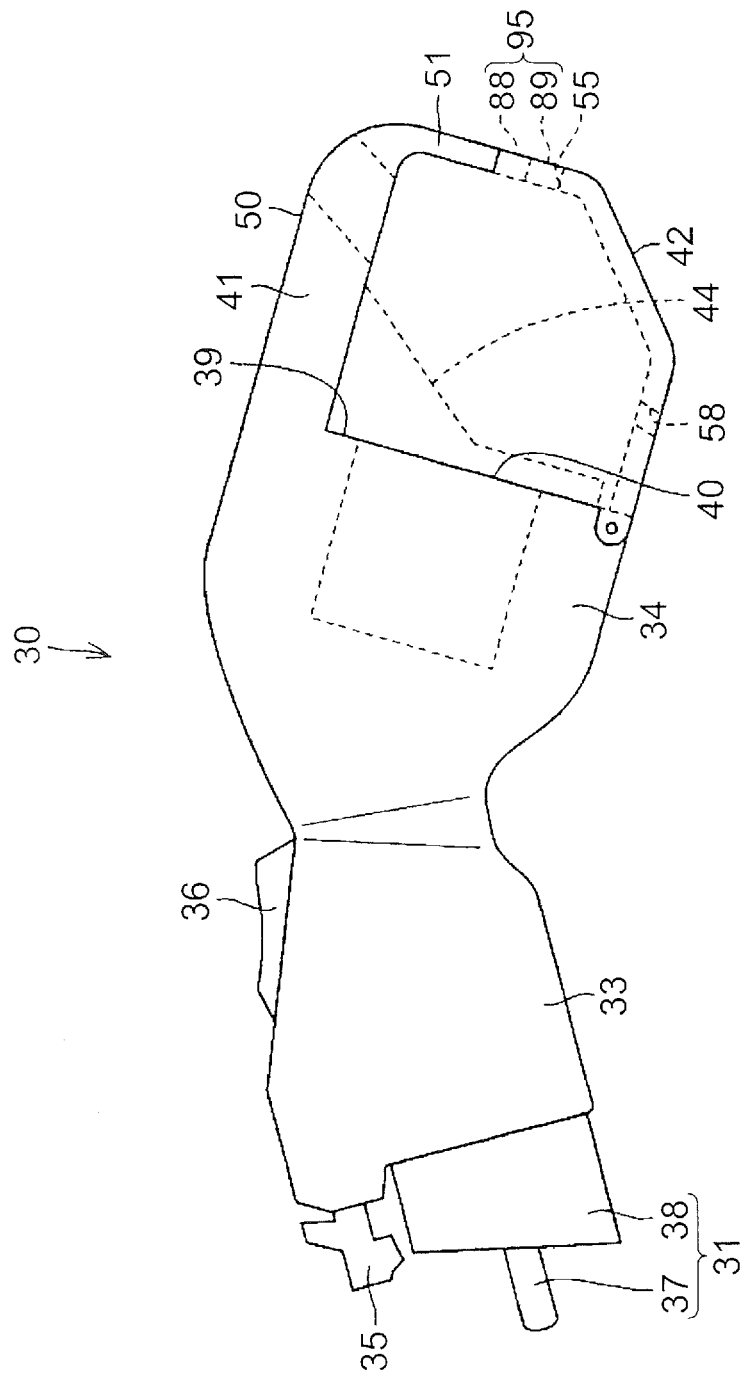
FIG. 16 is a side view illustrating a power extraction device 30 according to Embodiment 2.

FIG. 16 is a side view illustrating the power extraction device 30 according to Embodiment 2. As illustrated in FIG. 16, the power extraction device 30 includes a seal 95 configured to seal a cord of an electric plug to be drawn from a cover 42.

The seal 95 includes a seal 88 provided in a suspended portion 51, and a seal 89 provided in an upper hem portion of the cover 42.

Figure 17:
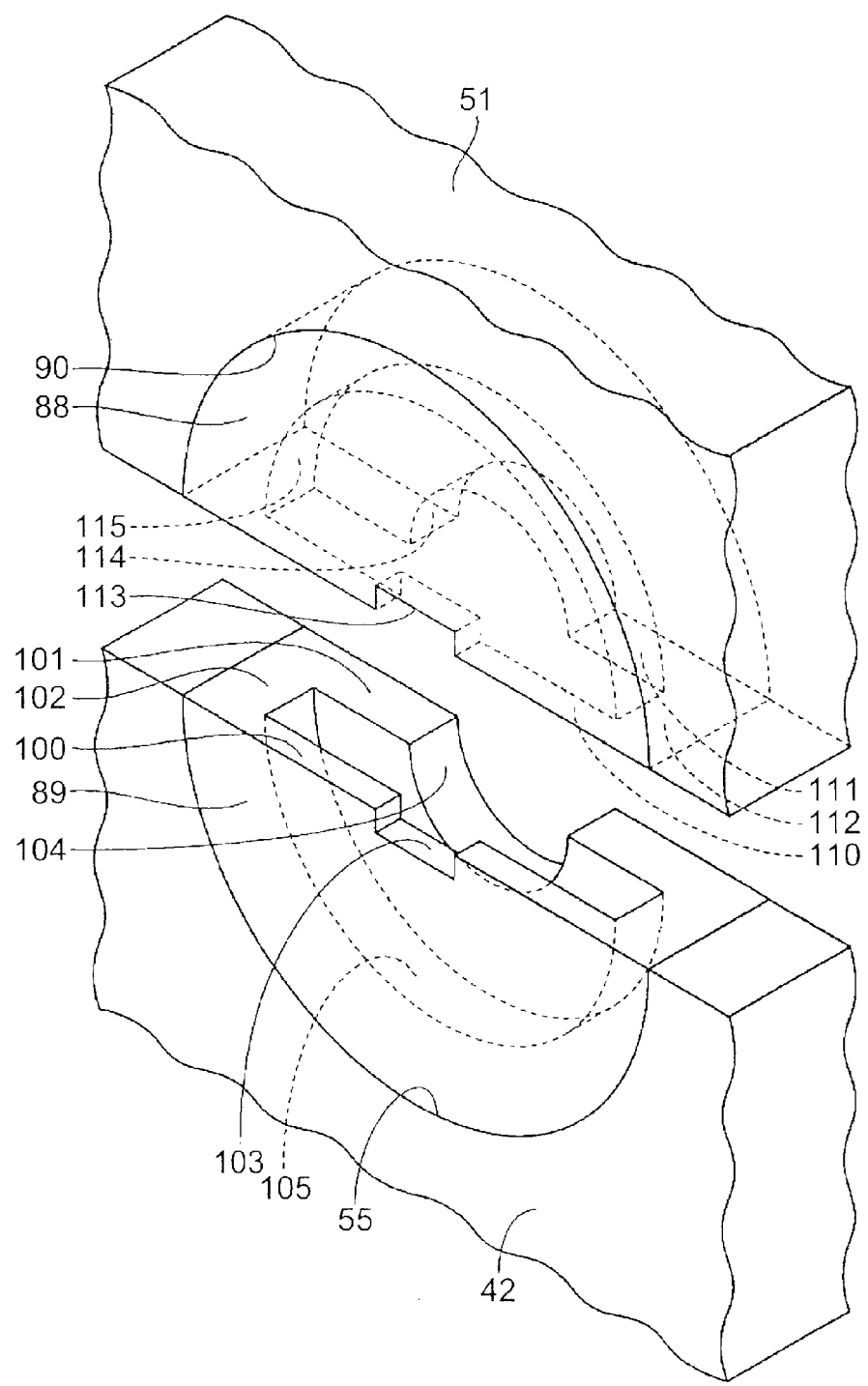
FIG. 17 is a perspective view illustrating a configuration of seals 88, 89 and a vicinal area thereof.

FIG. 17 is a perspective view illustrating a configuration of the seals 88, 89 and a vicinal area thereof. As illustrated in FIG. 17, a recessed portion 55 is formed in the upper hem portion of the cover 42. Similarly, a recessed portion 90 is formed in a lower end of the suspended portion 51. The seal 89 is fitted in the recessed portion 55, and the seal 88 is fitted in the recessed portion 90.

Figure 18:
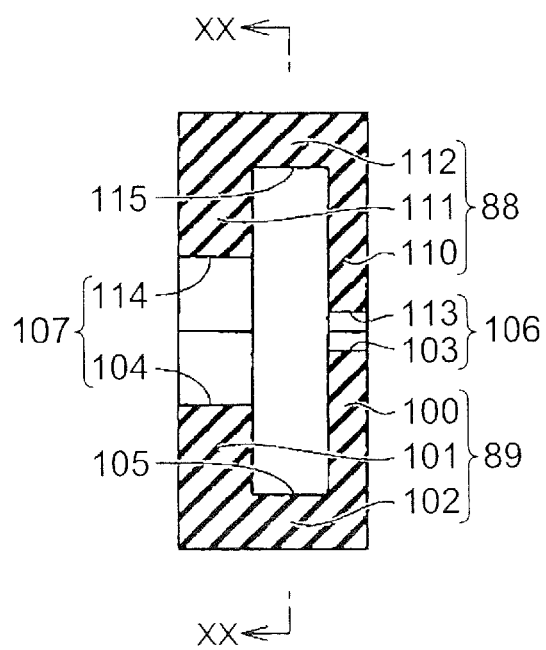
FIG. 18 is a sectional view illustrating the seal 88 and the seal 89 in a state where a cover 42 is fixed to a suspended portion 51.

FIG. 18 is a sectional view illustrating the seal 88 and the seal 89 in a state where the cover 42 is fixed to the suspended portion 51.

As illustrated in FIGS. 17, 18, the seal 89 includes: a seal piece 100 formed in a semicircular shape; a semicircular seal piece 101 placed closer to the connection surface 40 than the seal piece 100; and a peripheral wall portion 102 configured to connect an outer circumferential edge of the seal piece 100 to an outer circumferential edge of the seal piece 101.

The seal piece 100 and the seal piece 101 are placed at an interval. A groove 103 is formed in a top surface of the seal piece 100, and a groove 104 is also formed in a top surface of the seal piece 101.

A gap portion 105 is formed between the seal piece 100 and the seal piece 101 by the seal piece 100, the seal piece 101, and the peripheral wall portion 102.

The seal 88 includes: a seal piece 110 formed in a semicircular shape; a semicircular seal piece 111 placed closer to the connection surface 40 than the seal piece 110; and an opening gap portion 115 configured to connect a circumferential edge of the seal piece 110 to a circumferential edge of the seal piece 111.

A groove 113 is formed in a lower hem portion of the seal piece 110. A groove 114 is also formed in a lower hem portion of the seal piece 111. The seal piece 110 and the seal piece 111 are placed at an interval, and the opening gap portion 115 is formed by the seal piece 110, the seal piece 111, and a peripheral wall portion 112.

Figure 19:
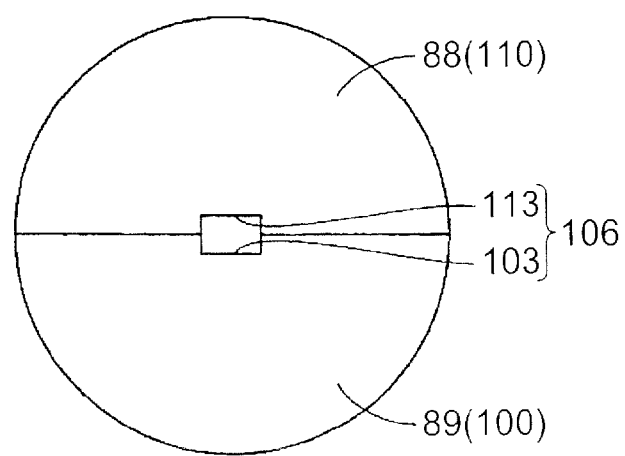
FIG. 19 is a front view illustrating the seal 88 and the seal 89 in the state illustrated in FIG. 18.

FIG. 19 is a front view illustrating the seal 88 and the seal 89 in the state illustrated in FIG. 18. As illustrated in FIGS. 19 and 18, when the cover 42 is fixed to the protruding portion 41, the top surface of the seal piece 100 makes contact with a bottom surface of the seal piece 111, and an insertion hole 106 from which a cord is drawn is formed by the groove 103 and the groove 113. The insertion hole 106 is formed in a rectangular shape and in an oblong manner.

Figure 20:
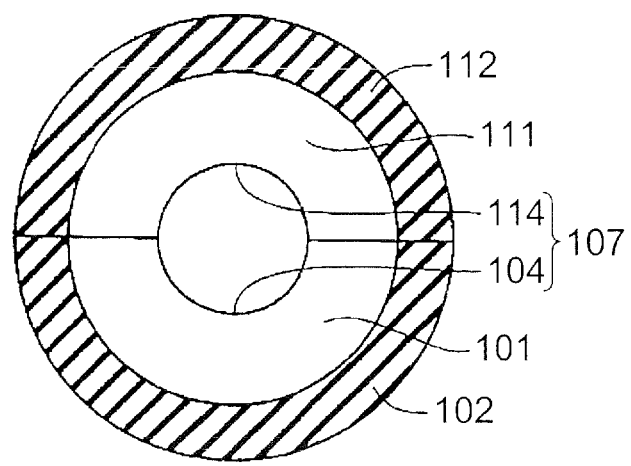
FIG. 20 is a sectional view taken along a line XX-XX in FIG. 18.

FIG. 20 is a sectional view taken along a line XX-XX in FIG. 18. As illustrated in FIG. 20, when the cover 42 is fixed to the protruding portion 41, the top surface of the seal piece 101 makes contact with the bottom surface of the seal piece 111. An insertion hole 107 from which a cord is drawn is formed by a groove 104 formed in the seal piece 101 and a groove 114 formed in the seal piece 111. The insertion hole 107 is formed in a circular shape.

Here, in FIGS. 19 and 20, an aperture area of the insertion hole 107 is larger than an aperture area of the insertion hole 106.

Figure 21:
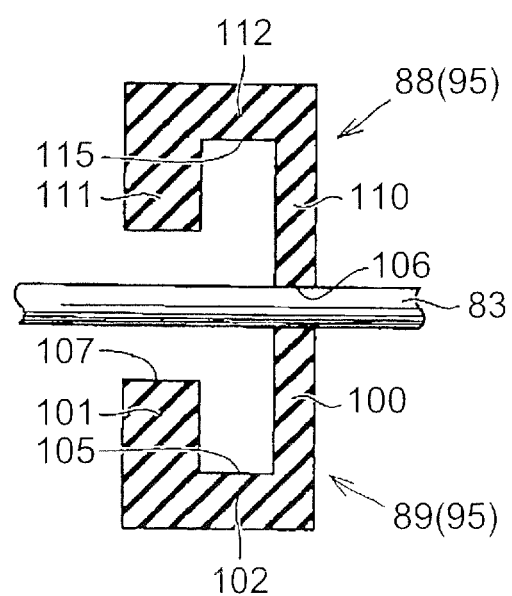
FIG. 21 is a sectional view of a seal 95 in a state where a cord 83 having a small diameter is drawn therefrom.
Figure 22:
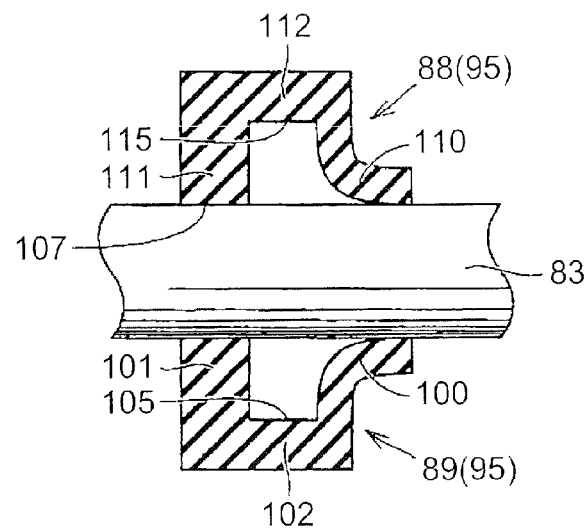
FIG. 22 is a sectional view of the seal 95 in a state where a cord 83 having a large diameter is drawn therefrom.

FIG. 21 is a sectional view of the seal 95 in a state where a cord 83 having a small diameter is drawn therefrom, and FIG. 22 is a sectional view of the seal 95 in a state where a cord 83 having a large diameter is drawn therefrom. In FIG. 21, the one with a small diameter is sandwiched between the seal piece 110 and the seal piece 100, and is drawn out from the insertion hole 106. In view of this, it is possible to restrain rain water or the like foreign matters from coming inside the cover 42 by the seal piece 110 and the seal piece 100.

Further, even if rain water or the like foreign substances comes inside the seal 95 from between the cord 83, the seal piece 100, and the seal piece 110, since the gap portions 105, 115 and the seal pieces 101, 111 are formed in the seal 89, 88, it is possible to restrain the rain water or the like foreign matters from coming inside the cover 42.

In FIG. 22, the cord 83 having a large diameter is inserted into the insertion hole 107, and the cord 83 is sandwiched between the seal piece 111 and the seal piece 101. This makes it possible to restrain rain water or the like foreign matters from coming inside the cover 42. The seal piece 100 and the seal piece 110 are defoliated so as to be curved by the cord 83, and restrain rain water from coming therein from outside.

Further, since the gap portions 105, 115 are formed between the seal pieces 101, 111 and the seal pieces 100, 110, it is possible to restrain rain water or the like foreign matters that come inside over the seal pieces 100, 110 from coming inside the cover 42.

With reference to FIGS. 23 to 28, the following describes a first modified embodiment of the seal.

Figure 23:
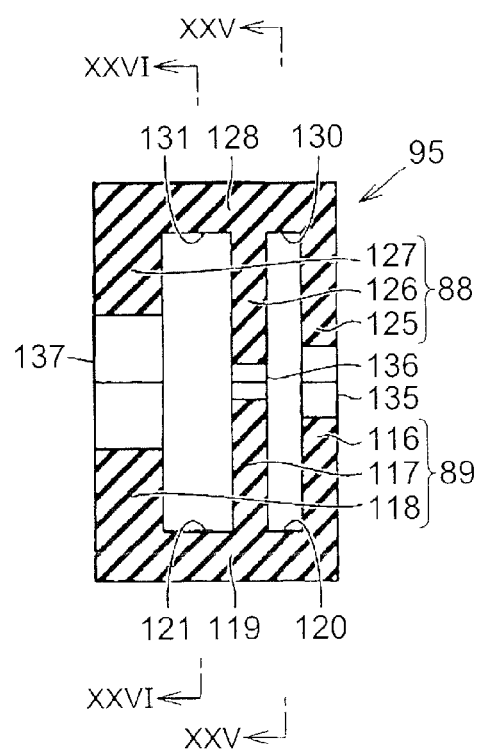
FIG. 23 is a sectional view illustrating a seal 95 according to a first modified embodiment.

FIG. 23 is a sectional view illustrating a seal 95 according to the first modified embodiment. As illustrated in FIG. 23, a seal 89 includes: a seal piece 116; a seal piece 117 placed closer to a connection surface 40 than the seal piece 116; a seal piece 118 placed closer to the connection surface 40 than the seal piece 117; and a peripheral wall portion 119.

The seal pieces 116, 117, 118 are formed in a semicircular shape. The peripheral wall portion 119 connects an outer circumferential edge of the seal piece 116, an outer circumferential edge of the seal piece 117, and an outer circumferential edge of the seal piece 118 to each other. An opening gap portion 120 is formed between the seal piece 116 and the seal piece 117, and an opening gap portion 121 is formed between the seal piece 117 and the seal piece 118.

A seal 88 includes: a seal piece 125; a seal piece 126 placed closer to the connection surface 40 than the seal piece 125; a seal piece 127 placed closer to the connection surface 40 than the seal piece 126; and a peripheral wall portion 128.

The peripheral wall portion 128 is formed so as to connect an outer circumferential edge of the seal piece 125, an outer circumferential edge of the seal piece 126, and an outer circumferential edge of the seal piece 127 to each other. An opening gap portion 130 is formed between the seal piece 125 and the seal piece 126, and an opening gap portion 131 is formed between the seal piece 126 and the seal piece 127.

Figure 24:
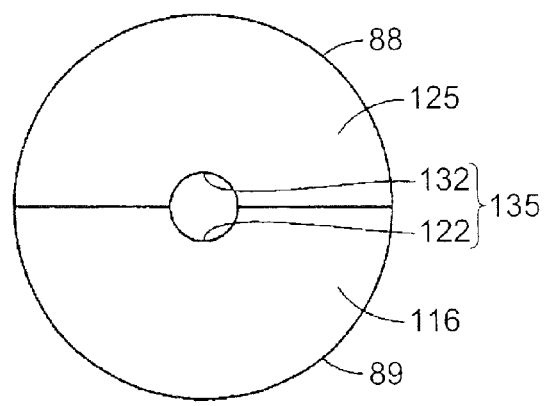
FIG. 24 is a front view of the seal 95 in a state where a cover 42 is fixed to a protruding portion 41.

FIG. 24 is a front view of the seal 95 in a state where a cover 42 is fixed to a protruding portion 41. As illustrated in FIG. 24, the seal piece 116 is formed in a semicircular shape, and a groove 122 is formed in a top surface of the seal piece 116.

A seal piece 125 is also formed in a semicircular shape, and a groove 132 is formed in a bottom surface of the seal piece 125.

When the cover 42 is fixed to the protruding portion 41, the bottom surface of the seal piece 125 makes contact with the top surface of the seal piece 116. An insertion hole 135 from which a cord is drawn is formed by the groove 122 and the groove 132.

Figure 25:
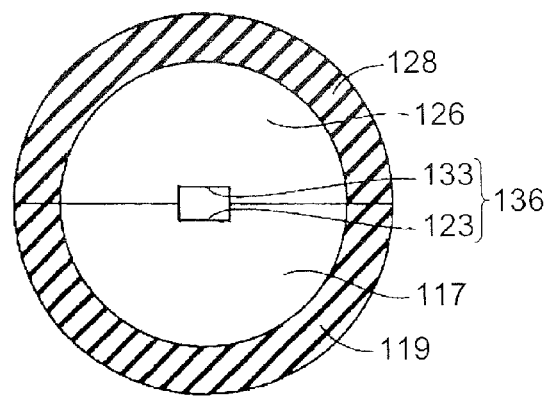
FIG. 25 is a sectional view taken along a line XXV-XXV in FIG. 23.

FIG. 25 is a sectional view taken along a line XXV-XXV in FIG. 23. As illustrated in FIG. 25, the seal piece 117 is formed in a semicircular shape, and a groove 123 is formed in a top surface of the seal piece 117. The seal piece 126 is also formed in a semicircular shape, and a groove 133 is formed in a bottom surface of the seal piece 126.

In a state where the cover 42 is fixed to the protruding portion 41, the top surface of the seal piece 117 makes contact with the bottom surface of the seal piece 126, so that an insertion hole 136 is formed by the groove 123 and the groove 133.

Figure 26:
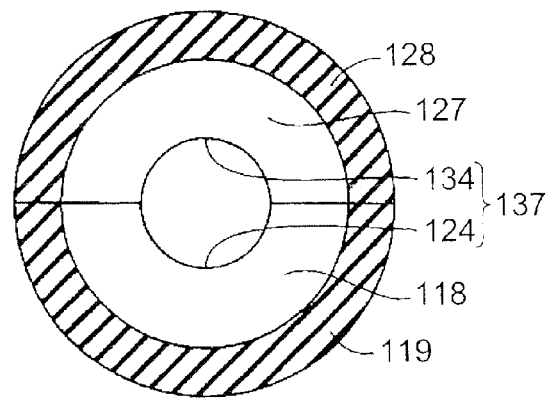
FIG. 26 is a sectional view taken along a line XXVI-XXVI in FIG. 23.

FIG. 26 is a sectional view taken along a line XXVI-XXVI in FIG. 23. As illustrated in FIG. 26, the seal piece 118 is formed in a semicircular shape, and the seal piece 127 is also formed in a semicircular shape. A groove 124 is formed in a top surface of the seal piece 118, and a groove 134 is also formed in a bottom surface of the seal piece 127. In a state where the cover 42 is fixed to the protruding portion 41, the top surface of the seal piece 118 makes contact with the bottom surface of the seal piece 127, so that an insertion hole 137 is formed by the groove 124 and the groove 134.

Here, an aperture area of the insertion hole 136 illustrated in FIG. 25 is smaller than an aperture area of the insertion hole 135 illustrated in FIG. 24. The aperture area of the insertion hole 135 illustrated in FIG. 24 is smaller than an aperture area of the insertion hole 137 illustrated in FIG. 26.

That is, the insertion hole 137 having the largest aperture area is placed closer to the connection surface 40 than the insertion hole 136 having the smallest aperture area. The insertion hole 135 having an aperture area that is larger than the insertion hole 136 and smaller than the insertion hole 137 is placed on an outer side relative to the insertion hole 135.

Figure 27:
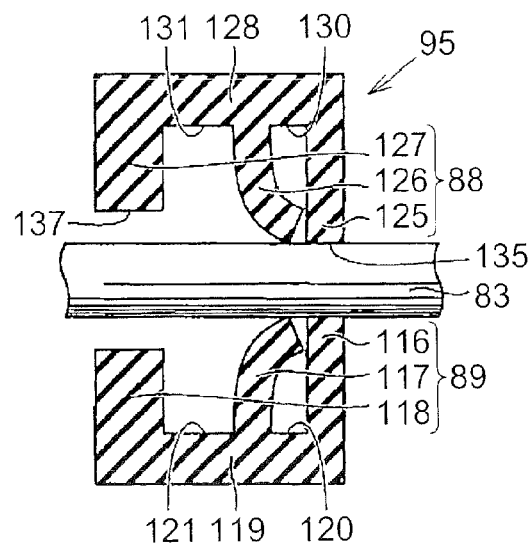
FIG. 27 is a sectional view of the seal 95 in a state where a cord 83 is drawn therefrom.

FIG. 27 is a sectional view of the seal 95 in a state where a cord 83 is drawn therefrom. In an example illustrated in FIG. 27, a sectional area of the cord 83 is generally the same as the aperture area of the insertion hole 135 illustrated in FIG. 24.

In FIG. 27, the cord 83 is sandwiched between the seal piece 116 and the seal piece 125, and is drawn out from the insertion hole 135.

This accordingly restrains rainwater or the like foreign substances from coming inside the seal 95 and the cover 42. Further, since the opening gap portion 120, the seal pieces 117, 126, and the opening gap portion 121 are sequentially placed between the seal pieces 116, 125 and the seal pieces 118, 127, it is possible to restrain rain water or the like foreign matters that come inside the seal 95 from coming inside the cover 42.

Figure 28:
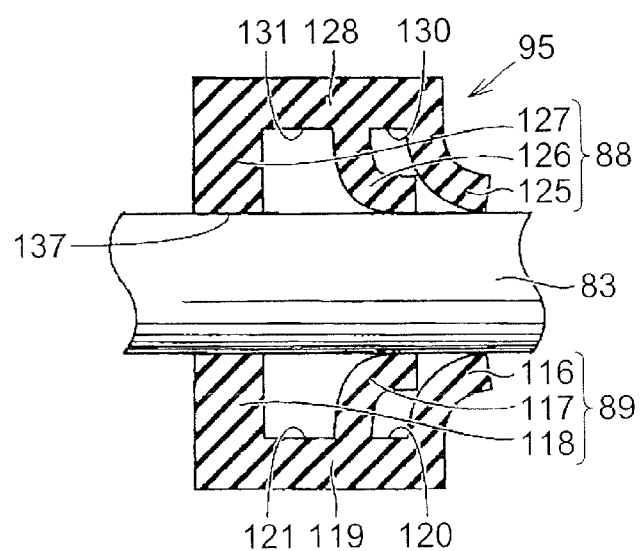
FIG. 28 is a sectional view illustrating the seal 95 when a cord 83 having a large diameter is drawn therefrom.

FIG. 28 is a sectional view illustrating the seal 95 when a cord 83 having a large diameter is drawn therefrom. A sectional area of the cord 83 illustrated in FIG. 28 is generally the same as the aperture area of the insertion hole 137 illustrated in FIG. 26.

Hereby, the cord 83 is sandwiched between the seal piece 118 and the seal piece 127, thereby restraining external rain water or the like foreign matters from coming inside the cover 42. Note that the seal pieces 116, 117, 125, 126 are curved by the cord 83 and make contact with a peripheral surface of the cord 83, thereby restraining external rain water or the like foreign matters from coming inside the cover 42.

Thus, according to the seal 95 of the first modified embodiment illustrated in FIGS. 23 to 28, it is possible to successfully restrain external rain water from coming inside the cover 42.

Next will be descried a seal 95 according to a second modified embodiment with reference to FIGS. 29 to 33. Note that the seal 95 according to the second modified embodiment is different from the seal 95 according to the first modified embodiment in that a size of an insertion hole of the seal 95 is changed. In view of this, in FIGS. 29 to 33, a constituent generally the same as a constituent as illustrated in FIGS. 23 to 28 has the same reference sign as in FIGS. 23 to 28, and a description thereof may be omitted.

Figure 29:
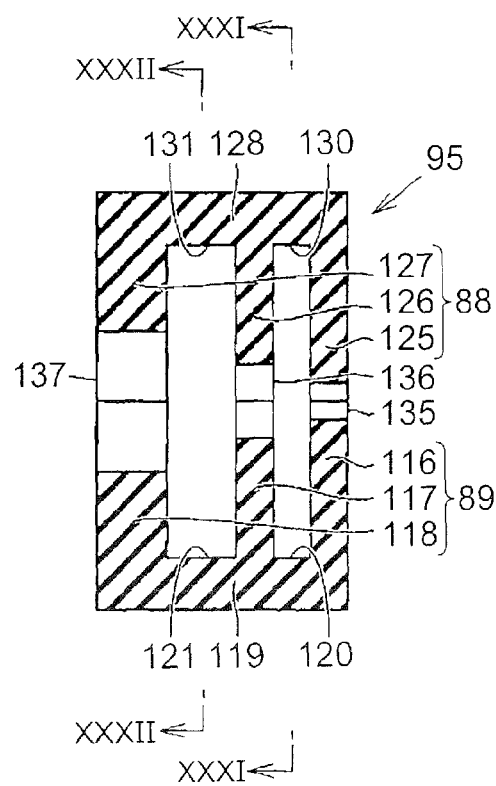
FIG. 29 is a sectional view of a seal 95 according to a second modified embodiment.
Figure 30:
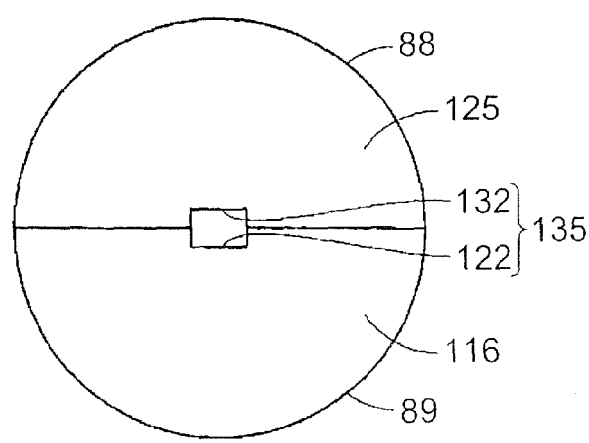
FIG. 30 is a front view of the seal 95 illustrated in FIG. 29.
Figure 31:
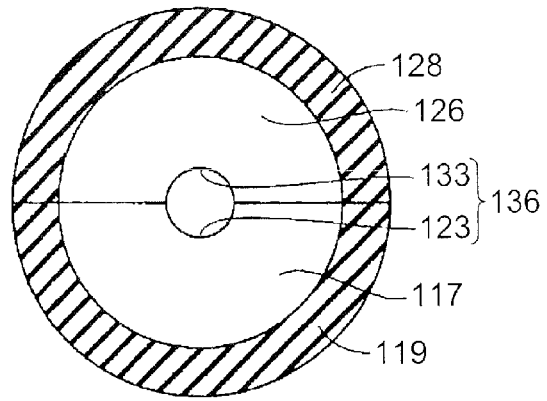
FIG. 31 is a sectional view taken along a line XXXI-XXXI in FIG. 29.

FIG. 29 is a sectional view of the seal 95 according to the second modified embodiment. FIG. 30 is a front view of the seal 95 illustrated in FIG. 29. As illustrated in FIG. 30, an insertion hole 135 is formed by a groove 122 and a groove 132. FIG. 31 is a sectional view taken along a line XXXI-XXXI in FIG. 29. As illustrated in FIG. 31, an insertion hole 136 is formed by a groove 123 and a groove 133.

Figure 32:
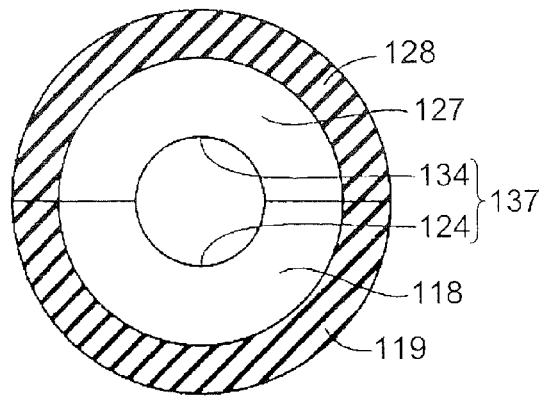
FIG. 32 is a sectional view taken along a line XXXII-XXXII in FIG. 29.

FIG. 32 is a sectional view taken along a line XXXII-XXXII in FIG. 29. As illustrated in FIG. 32, an insertion hole 137 is formed by a groove 124 and a groove 134.

Here, as illustrated in FIGS. 30 to 32, in the seal 95 according to the second modified embodiment, an aperture area of the insertion hole 135 is smaller than aperture areas of the insertion hole 136 and the insertion hole 137. The aperture area of the insertion hole 136 is smaller than that of the insertion hole 137.

That is, as illustrated in FIG. 29, a plurality of insertion holes is formed in the seal 95, and the insertion holes are provided in ascending order of the aperture area from an outside toward a connection surface 40.

Figure 33:
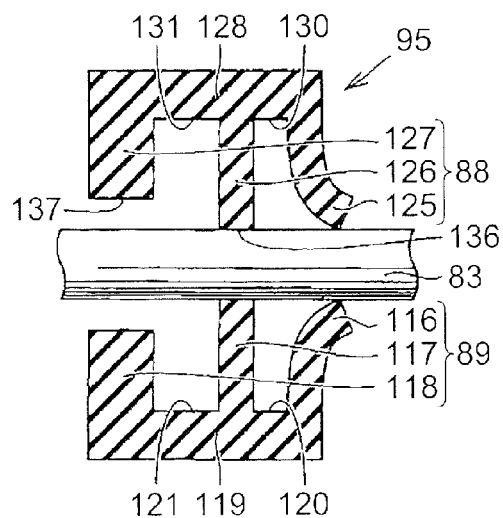
FIG. 33 is a sectional view of the seal 95 in a state where a cord 83 is drawn therefrom.

FIG. 33 is a sectional view of the seal 95 in a state where a cord 83 is drawn therefrom. In FIG. 33, a sectional area of the cord 83 is generally the same as the aperture area of the insertion hole 136 illustrated in FIG. 31. Accordingly, the cord 83 is sandwiched between the seal piece 117 and the seal piece 126, thereby restraining external rain water or the like foreign matters from coming inside the cover 42.

Note that the above description deals with an example in which the seal 88, the seal 89, and the like employed herein have a semicircular shape. However, it is possible to employ various shapes such as a square shape and a semielliptical shape for the seal 89, the seal 89, and the like.

Embodiment 3

With reference to FIGS. 34 to 38, the following describes a power extraction device 30 according to Embodiment 3. Note that, among constituents illustrated in FIGS. 34 to 38, a constituent the same as or equivalent to a constituent as illustrated in FIGS. 1 to 33 has the same reference sign as in FIGS. 1 to 33, and a description thereof may be omitted.

Figure 34:
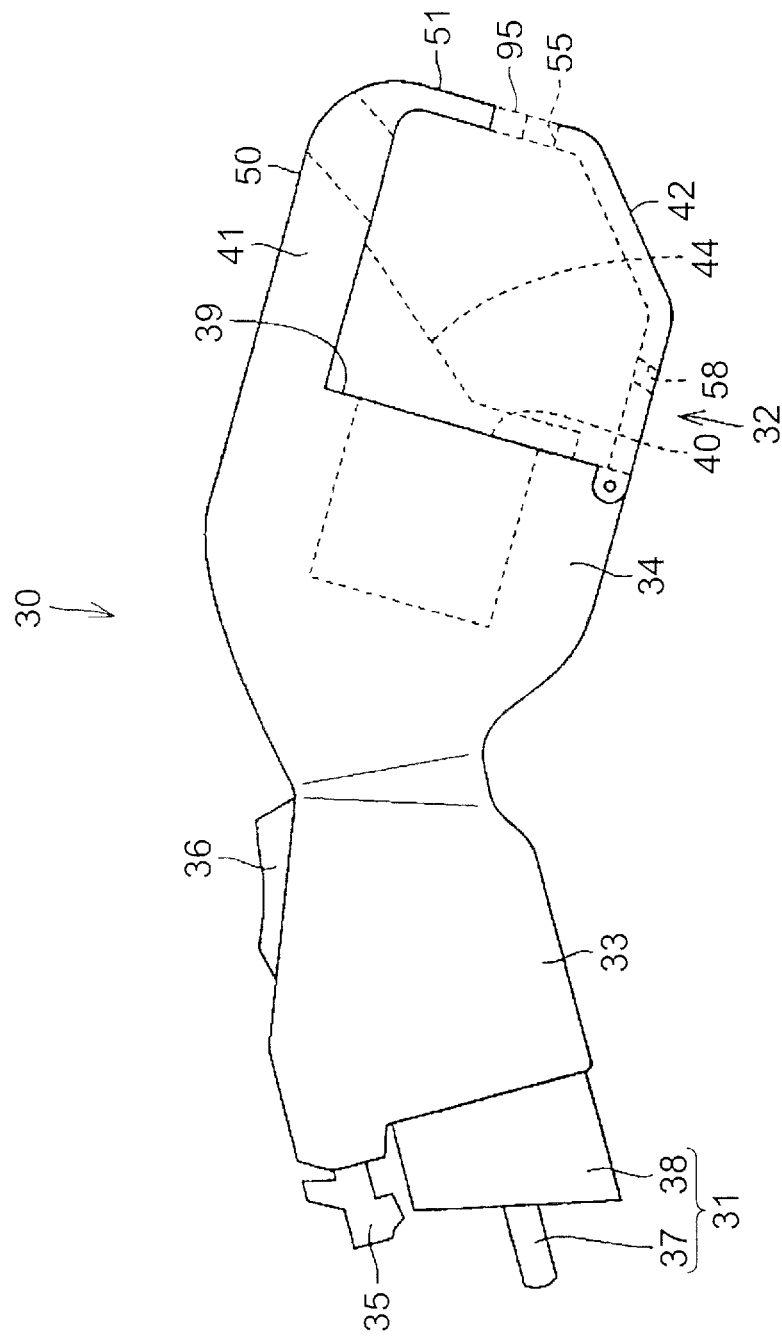
FIG. 34 is a side view illustrating a power extraction device 30 according to Embodiment 3.

FIG. 34 is a side view illustrating the power extraction device 30 according to Embodiment 3. As illustrated in FIG. 34, the power extraction device 30 according to Embodiment 3 includes: a body portion 33 having one end in which a connecting portion 31 is formed; a body portion 34 connected to the body portion 33; and a connecting portion 32 provided in an end of the body portion 34.

The connecting portion 32 includes: a connection surface 40; a protruding portion 41 formed above the connection surface 40 and protruding outwardly; a cover 42 rotatably provided below the connection surface 40; and a seal 95.

Figure 35:
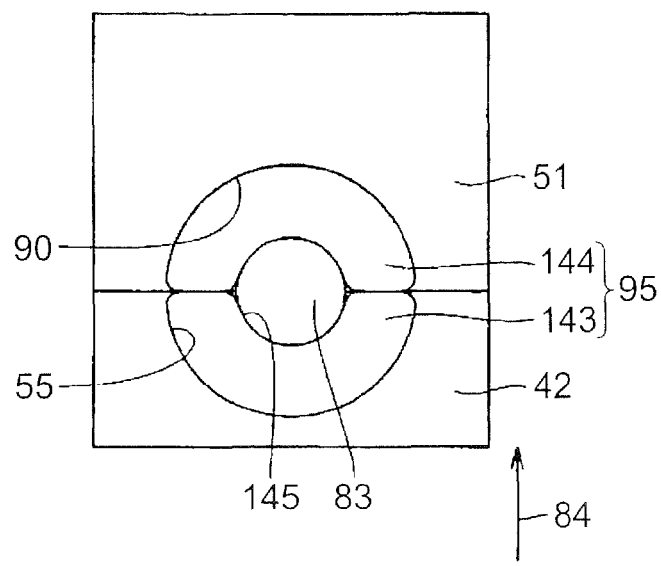
FIG. 35 is a front view illustrating a configuration at a position of a seal 95 provided in the power extraction device 30 according to Embodiment 3, and its vicinal area.

FIG. 35 is a front view illustrating a configuration at a position of the seal 95 provided in the power extraction device 30 according to Embodiment 3, and its vicinal area. As illustrated in FIG. 35, a recessed portion 55 is formed in an upper hem portion of a drawing hole 142, and a recessed portion 90 is formed in a lower hem portion of a suspended portion 51. The seal 95 includes a seal 140 and a seal 141 within recessed portion 55.

The seal 140 and the seal 141 are formed in a hollow shape, for example, and are formed so as to seal air thereinside. Here, the seal 140 and the seal 141 are arranged in a direction intersecting with a closing direction 84. The seal 141 and the seal 140 are formed in an elongated shape in the closing direction 84, and the seal 140 and the seal 141 are formed to protrude from an upper hem portion of the cover 42 in the closing direction 84.

A slit 142 extending in the closing direction 84 is formed between the seal 140 and the seal 141. When the cover 42 is fixed to the suspended portion 51, those parts of the seals 140, 141 which protrude from the upper hem portion of the cover 42 come inside the recessed portion 90.

Here, when the cover 42 is closed in a state where an electric plug is connected to the connection surface 40 illustrated in FIG. 34, a cord 83 connected to the electric plug comes inside the slit 142 formed between the seal 140 and the seal 141. When upper end sides of the seal 140 and the seal 141 come inside the recessed portion 90, a peripheral surface of the cord 83 is surrounded by the seal 140 and the seal 141. This makes it possible to restrain external rain water or the like foreign matters from coming inside the cover 42.

Figure 36:
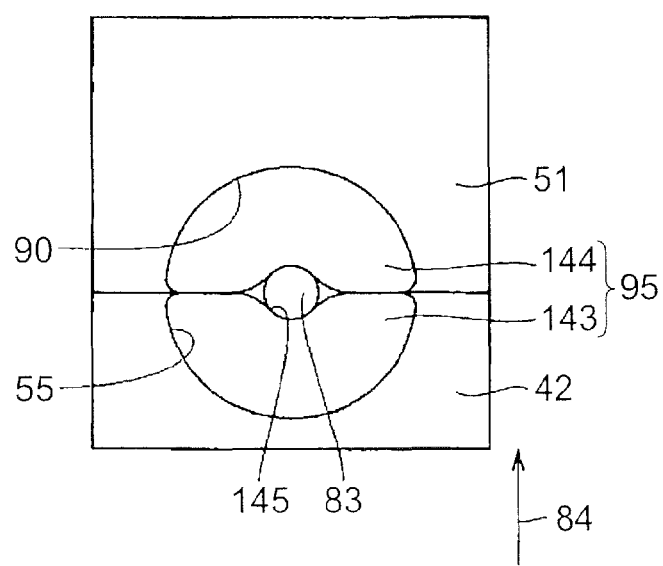
FIG. 36 is a front view of the seal 95 in a state where a cord 83 having a smaller diameter than a cord 83 illustrated in FIG. 35 is drawn therefrom.
Figure 38:
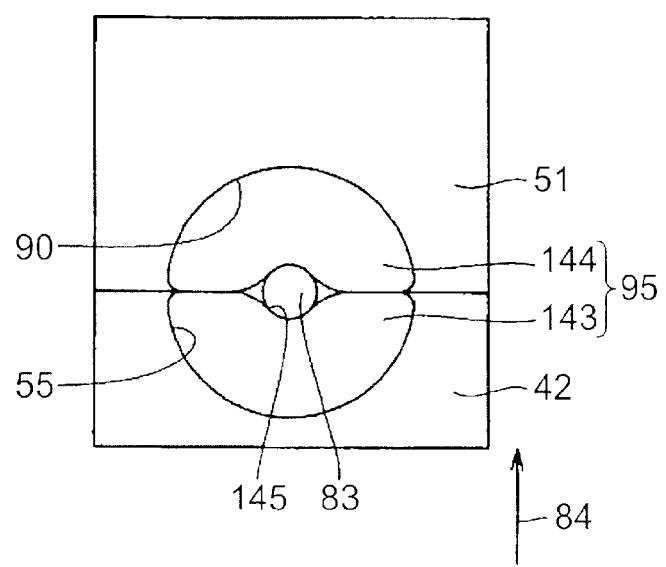
FIG. 38 is a front view of the seal 95 in a state where a cord 83 having a smaller diameter than a cord 83 illustrated in FIG. 37 is drawn from a cover 42.

FIG. 36 is a front view of the seal 95 in a state where a cord 83 having a smaller diameter than the cord 83 illustrated in FIG. 35 is drawn therefrom. In FIG. 36, air is sealed inside the seal 140 and the seal 141. Because of this, due to a pressure applied from its outside, sectional diameters of the seal 140 and the seal 141 are changed. Accordingly, as illustrated in FIG. 38, when the cord 83 having a small diameter is sealed, the sectional diameters of the seal 140 and the seal 141 are increased, and a peripheral surface of the cord 83 is sealed successfully. As such, it is possible to successfully seal any cords 83 having various sectional diameters.

Next will be described a first modified embodiment of the power extraction device 30 according to Embodiment 3, with reference to FIGS. 37 and 38. Note that, among constituents illustrated in FIGS. 37 and 38, a constituent the same as or equivalent to a constituent as illustrated in FIGS. 35 and 36 has the same reference sign as in FIGS. 35 and 36, and a description thereof may be omitted.

Figure 37:
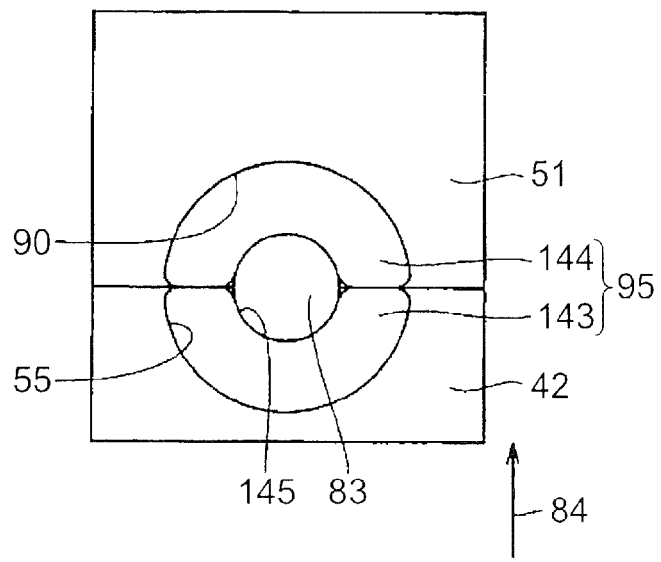
FIG. 37 is a front view illustrating a seal 95 provided in a power extraction device 30 according to a first modified embodiment.

FIG. 37 is a front view illustrating a seal 95 provided in a power extraction device 30 according to the first modified embodiment. As illustrated in FIG. 37, the seal 95 includes a seal 143 provided in a recessed portion 55 of a cover 42, and a seal 144 provided in a recessed portion 90 of a suspended portion 51.

The seal 143 extends along a shape of the recessed portion 55 and is formed in an arc shape. The seal 144 also extends along a shape of the recessed portion 90 and is formed in an arc shape. Note that an opening gap portion is formed in each of the seal 143 and the seal 144, and sectional diameters of the seal 143 and the seal 144 are changed due to an external force applied thereto from their outside.

Accordingly, in a state where a cord 83 is not drawn, for example, the seal 143 and the seal 144 make close contact with each other, so that a gap between the seal 143 and the seal 144 is closed.

As illustrated in FIG. 37, when the cord 83 is drawn from the cover 42, the seal 143 and the seal 144 are deformed, so that an insertion hole 145 is formed.

FIG. 38 is a front view of the seal 95 in a state where a cord 83 having a smaller diameter than the example illustrated in FIG. 37 is drawn from the cover 42.

As illustrated in FIG. 38, when the cord 83 having a small diameter is drawn, sectional diameters of the seal 143 and the seal 144 become larger than a case illustrated in FIG. 37. A peripheral surface of the cord 83 having a small diameter makes close contact with the seal 143, and the peripheral surface of the cord 83 makes close contact with the seal 144, successfully.

As such, according to the seal 95 illustrated in FIGS. 37 and 38, even if any cords 83 having various diameters are drawn therefrom, it is possible to restrain rain water or the like foreign matters from coming inside the cover 42.

Embodiment 4

Figure 39:
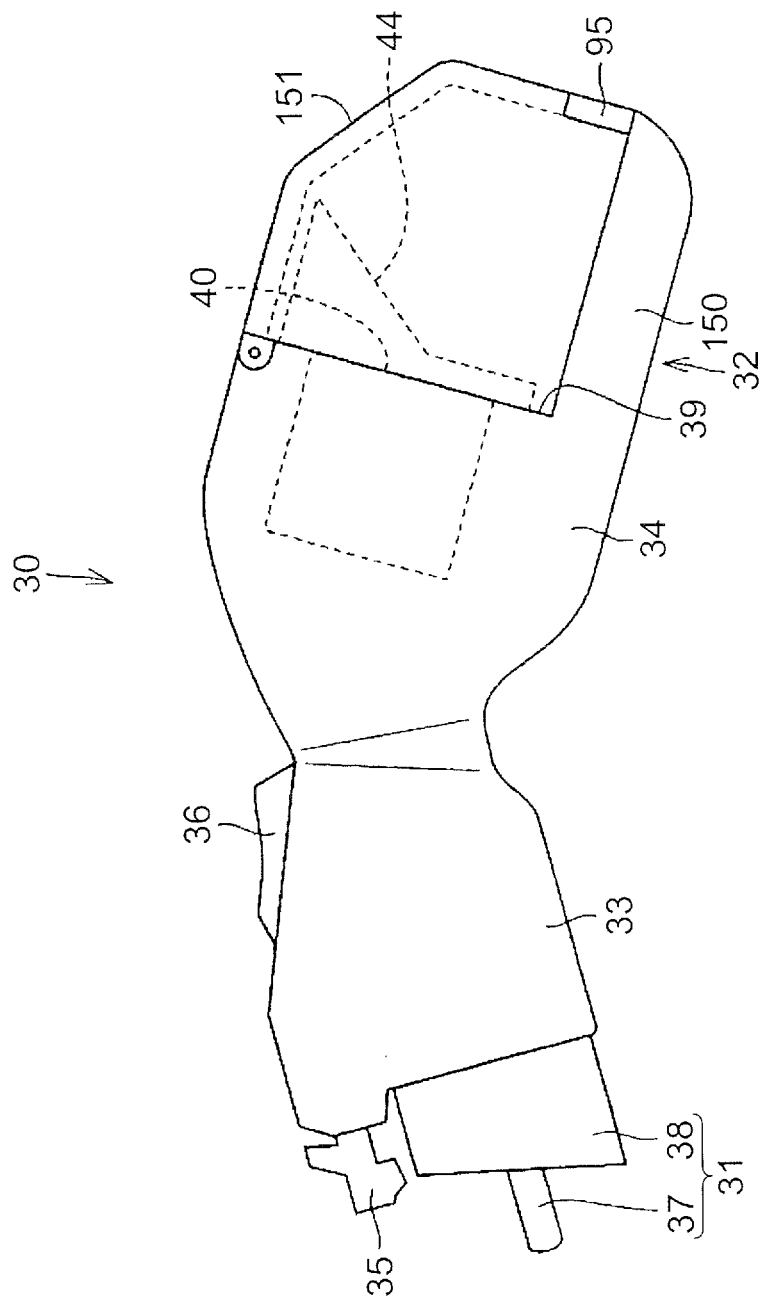
FIG. 39 is a side view illustrating a power extraction device 30 according to Embodiment 4.
Figure 40:
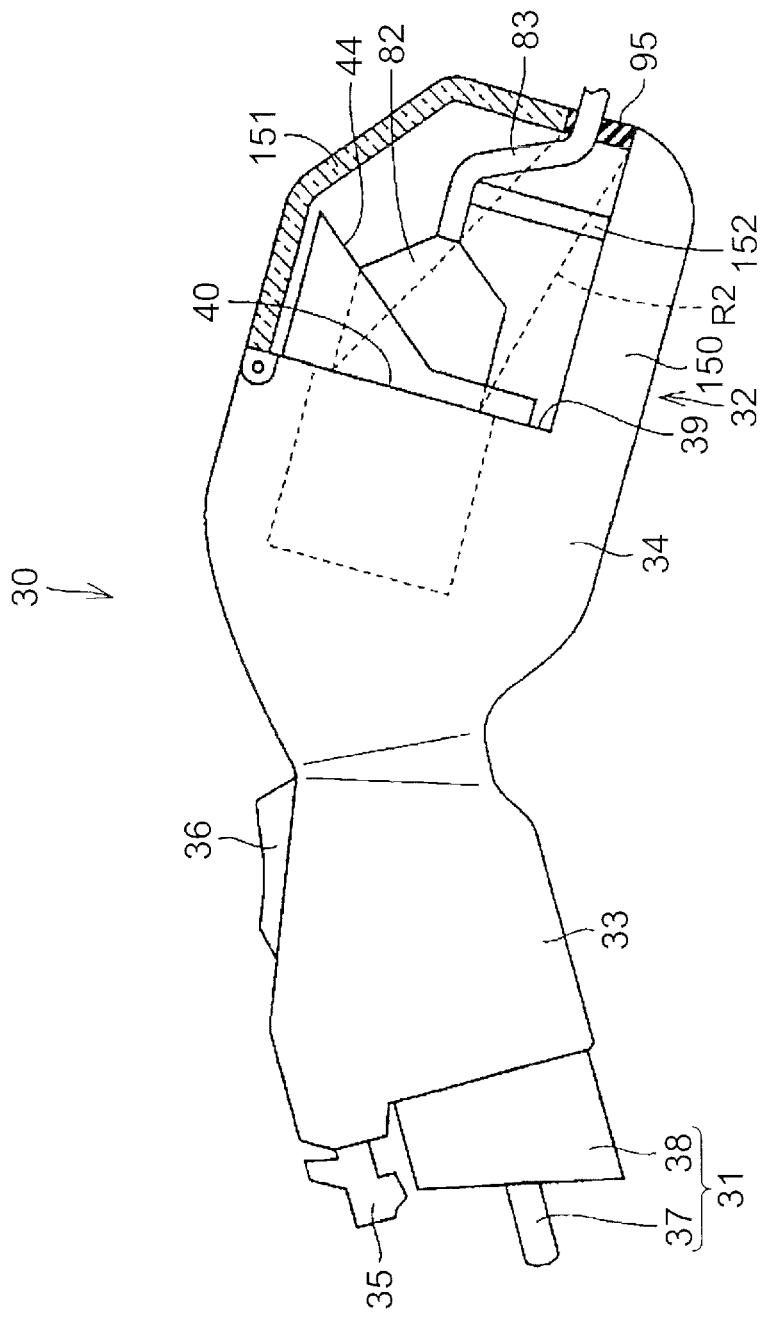
FIG. 40 is a side view illustrating a first modified embodiment of the power extraction device 30 according to Embodiment 4.
Figure 41:
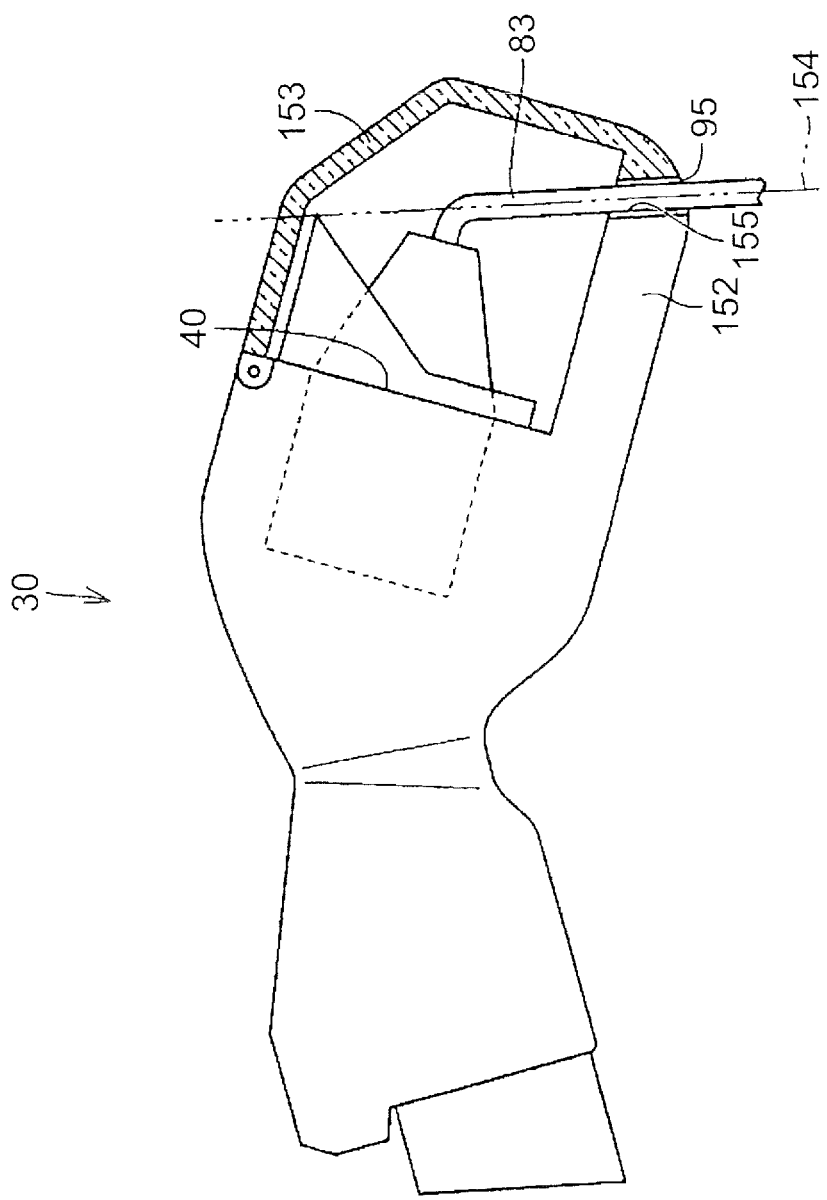

With reference to FIGS. 39 to 41, the following describes a power extraction device 30 according to Embodiment 4. Note that, among constituents illustrated in FIGS. 39 to 41, a constituent the same as or equivalent to a constituent as illustrated in FIGS. 1 to 38 has the same reference sign as in FIGS. 1 to 33, and a description thereof may be omitted.

FIG. 39 is a side view illustrating the power extraction device 30 according to Embodiment 4. As illustrated in FIG. 39, the power extraction device 30 includes: a body portion 33 having one end in which a connecting portion 31 is provided; a body portion 34 having one end connected to the body portion 33; and a connecting portion 32 provided in the other end of the body portion 34.

The connecting portion 32 includes: a connection surface 40 formed in an end surface 39 of the body portion 34; a protruding portion 150 formed below the connection surface 40 and protruding outwardly; a cover 151 rotatably provided above the connection surface 40; and a seal 95.

The cover 151 is formed from a material having a light-transmitting property, so that a user is able to see the connection surface 40 through the cover 151. The cover 151 includes an engagement portion engaged with an engagement groove formed in the protruding portion 150 so as to fix the cover 151 to the protruding portion 150. When the engagement portion is engaged with the engagement groove, the cover 151 is fixed to the protruding portion 150, so that the connection surface 40 is covered with the protruding portion 150 and the cover 151.

When an electric plug is connected to such a power extraction device 30, the cover 151 is opened, and then the electric plug is connected to the connection surface 40. After that, the cover 151 is closed. Then, a cord connected to the electric plug is drawn outside through the seal 95.

Here, when the electric plug is connected to the connection surface 40, the user is able to see the connection surface 40 and the electric plug through the cover 151, and thus, the use is able to perform a connection operation easily.

FIG. 40 is a side view illustrating a first modified embodiment of the power extraction device 30 according to Embodiment 4. Note that, among constituents illustrated in FIG. 40, a constituent the same as or equivalent to a constituent as illustrated in FIGS. 1 to 39 has the same reference sign as in FIGS. 1 to 39, and a description thereof may be omitted.

In FIG. 40, a protruding portion 150 is provided with a wall portion 152 provided so as to separate the connection surface 40 from the seal 95. Note that a recessed portion is formed in a lower end of a cover 151. When the cover 151 is fixed to the protruding portion 150, a drawing hole is formed by the protruding portion 150 and the recessed portion. The seal 95 is provided in the drawing hole. An insertion hole from which a cord 83 is drawn is formed in the seal 95.

Here, when a region that connects the seal 95 (the drawing hole) to the connection surface 40 is taken as a region R2, the region R2 is divided by the wall portion 152. Accordingly, even if rain water or the like foreign matters come inside the cover 42 through the insertion hole formed in the seal 95, it is possible to restrain, by the wall portion 152, the rain water from being attached to the connection surface 40.

Next will be described a second modified embodiment of the power extraction device 30 according to Embodiment 4, with reference to FIG. 41. Note that, among constituents illustrated in FIG. 41, a constituent the same as or equivalent to a constituent as illustrated in FIGS. 1 to 40 has the same reference sign as in FIGS. 1 to 40, and a description thereof may be omitted.

In FIG. 41, a power extraction device 30 includes: a connection surface 40 formed in an end of a body portion 34; a protruding portion 152 formed below the connection surface 40 and protruding outwardly; a cover 153 rotatably provided above the connection surface 40; and a seal 95. An insertion hole 155 from which a cord 83 is drawn is formed in the seal 95.

Here, a virtual straight line passing through the insertion hole 155 and extending in a direction where the insertion hole 155 extends is taken as a virtual straight line 154. The connection surface 40 is provided at a position distanced from the virtual straight line 154. That is, the virtual straight line 154 does not pass through the connection surface 40. Accordingly, even if rain water comes inside the insertion hole 155, it is possible to restrain the rain water from being attached to the connection surface 40.

Embodiment 5

Figure 42:
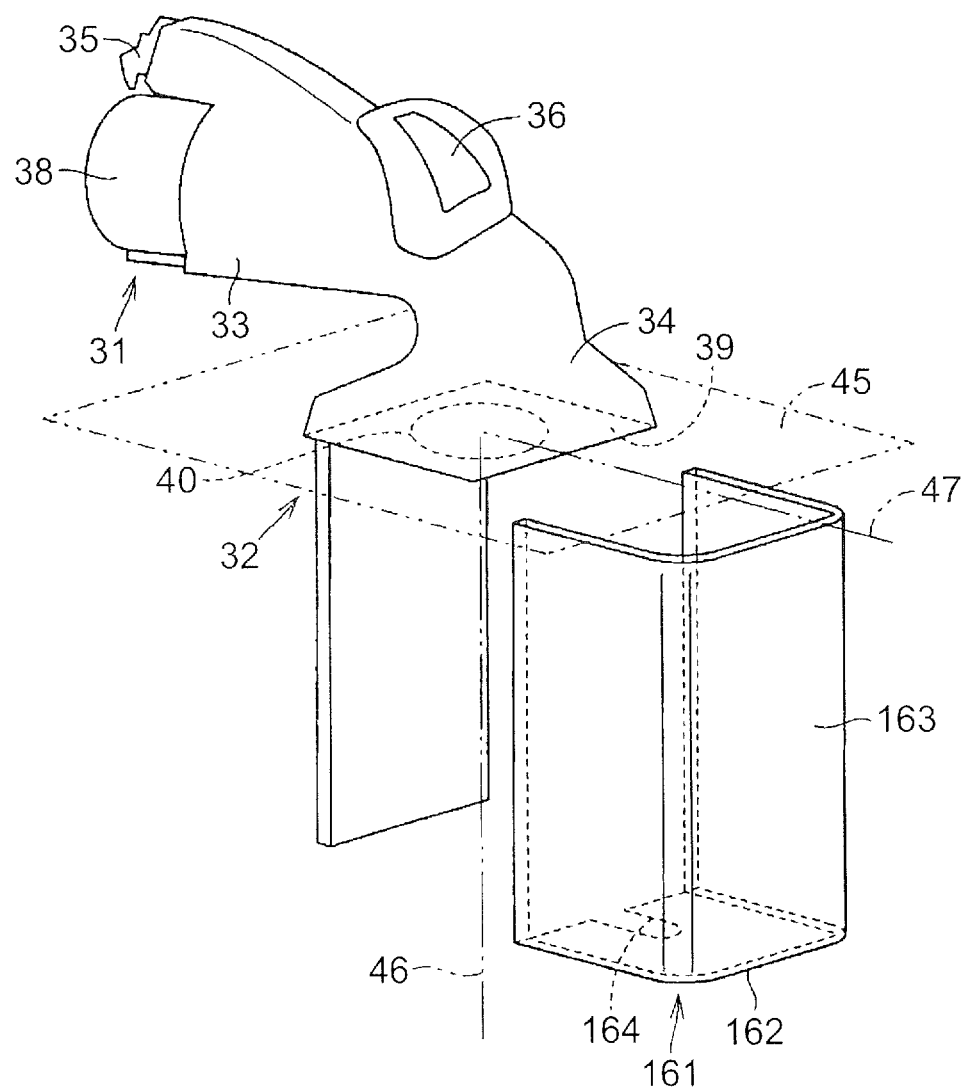
FIG. 42 is a side view illustrating a power extraction device 30 according to Embodiment 5.
Figure 43:
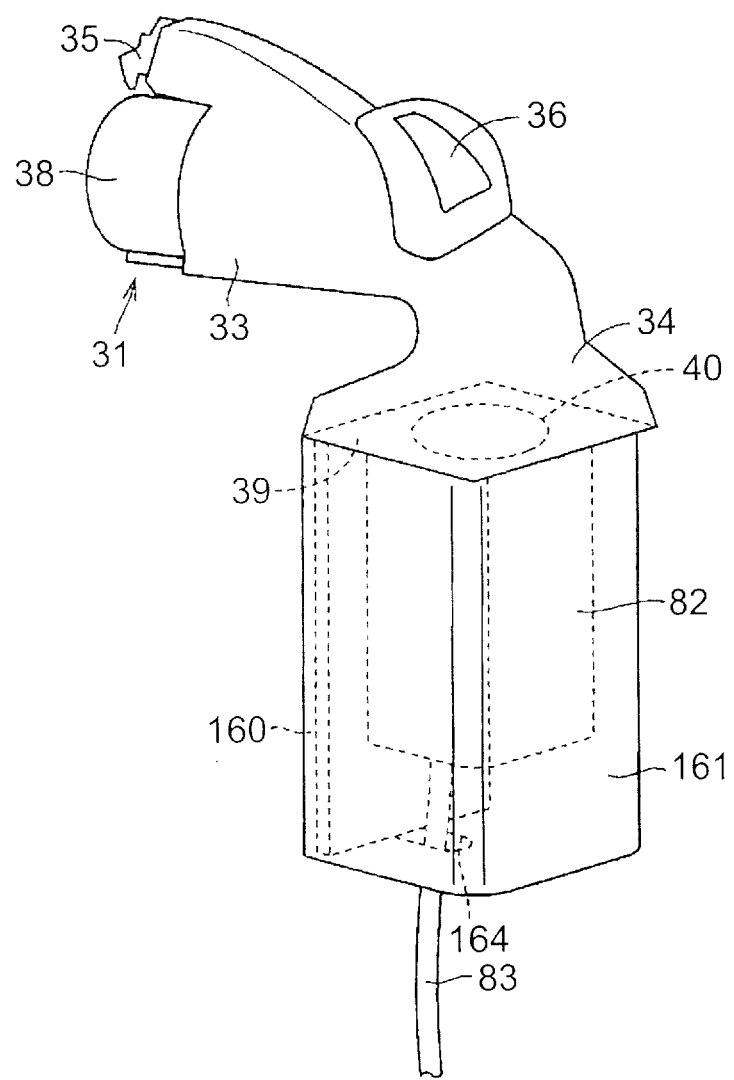
FIG. 43 is a perspective view illustrating a state where an electric plug 82 is connected to the power extraction device 30.

With reference to FIGS. 42 and 43, the following describes a power extraction device 30 according to Embodiment 5. Note that, among constituents illustrated in FIGS. 42 and 43, a constituent the same as or equivalent to a constituent as illustrated in FIGS. 1 to 41 has the same reference sign as in FIGS. 1 to 41, and a description thereof may be omitted.

FIG. 42 is a side view illustrating the power extraction device 30 according to Embodiment 5. As illustrated in FIG. 42, a connection surface 40 includes: a connecting portion 31 to be connected to a charging portion 21 of a vehicle 10; a body portion 33 having one end in which the connecting portion 31 is provided; a body portion 34 connected to the other end of the body portion 33; a connecting portion 32 provided in the other end of the body portion 34; and a cover 161 detachably provided in the connecting portion 32.

The connecting portion 32 includes: an end surface 39 placed in an end of the body portion 34; the connection surface 40 formed in the end surface 39; and a support plate 160 fixed to the end surface 39.

In a state where the connecting portion 31 is connected to the charging portion 21 of the vehicle 10, the end surface 39 and the connection surface 40 are placed in an inclined manner.

A virtual plane passing through the connection surface 40 is taken as a virtual plane 45, and a virtual straight line extending in a direction perpendicular to the virtual plane 45 and passing through the connection surface 40 is taken as a virtual straight line 46. Further, a virtual straight line passing through the connection surface 40 and extending in a horizontal direction is taken as a virtual straight line 47.

Here, as the virtual straight line 46 is farther from the connection surface 40, the virtual straight line 46 is inclined downward relative to the virtual straight line 47. Particularly, in the power extraction device 30 according to Embodiment 5, an angle between the virtual straight line 46 and the virtual straight line 47 is, for example, about not less than 45 degrees but not more than 85 degrees. The cover 161 includes a bottom surface 162, and a peripheral wall portion 163 connected to a peripheral part of the bottom surface 162. Note that the peripheral wall portion 163 is formed in a U shape.

FIG. 43 is a perspective view illustrating a state where an electric plug 82 is connected to the power extraction device 30.

In a state where the connecting portion 31 is connected to the charging portion 21, the cover 161 is removed, and then the electric plug 82 is connected to the connection surface 40. At this time, even if it is raining, since the connection surface 40 is placed to face downward, it is possible to restrain rain water from being attached to the connection surface 40. Further, the support plate 160 functions as a guide when the electric plug 82 is connected, and also functions as a waterproof plate that restrains rain water or the like from being attached to the connection surface 40.

When the cover 161 is attached, it is possible to restrain external foreign matters from being attached to the connection surface 40.

Embodiment 6

With reference to FIGS. 44 to 49, the following describes a power extraction device 30 according to Embodiment 6. Note that, among constituents illustrated in FIGS. 44 to 49, a constituent the same as or equivalent to a constituent as illustrated in FIGS. 1 to 43 has the same reference sign as in FIGS. 1 to 43, and a description thereof may be omitted.

Figure 44:
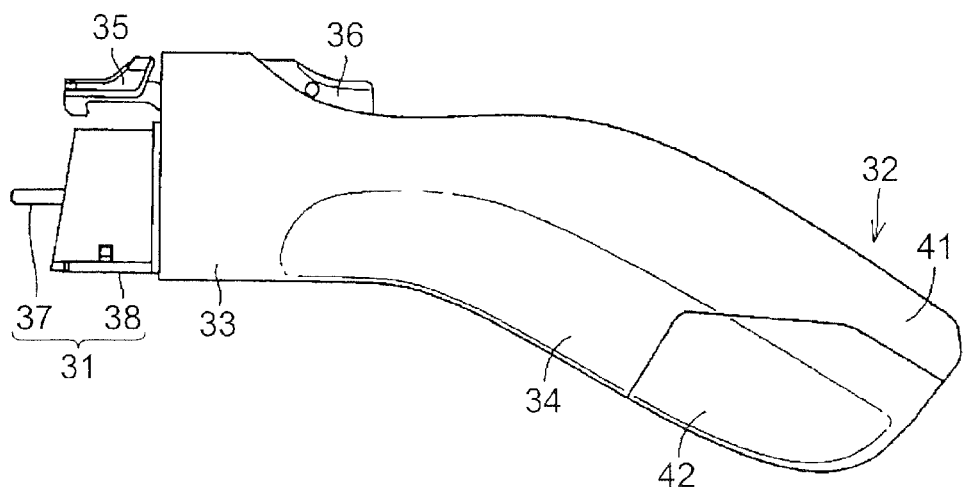
FIG. 44 is a side view illustrating a power extraction device 30 according to Embodiment 6.

FIG. 44 is a side view illustrating the power extraction device 30 according to Embodiment 6. As illustrated in FIG. 44, the power extraction device 30 includes: a body portion 33 provided with a connecting portion 31; and a connecting portion 32 provided with a connecting portion 32.

Figure 45:
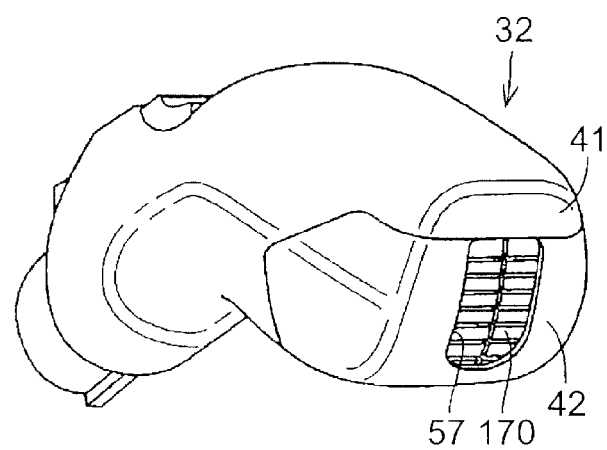
FIG. 45 is a perspective view illustrating a rear end of the power extraction device 30.
Figure 46:
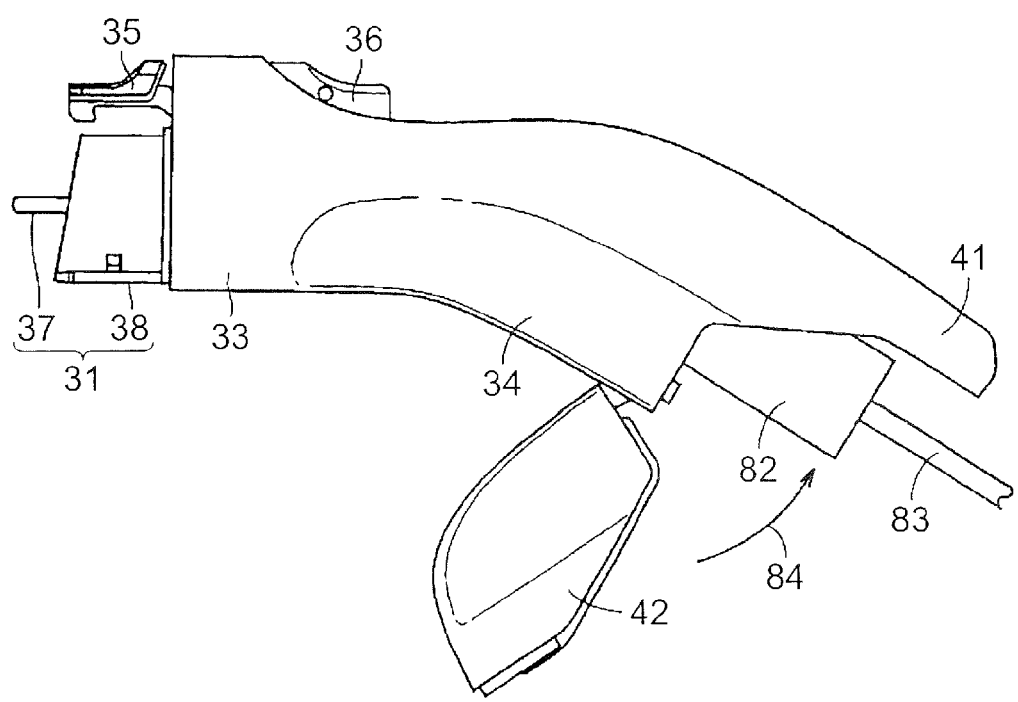
FIG. 46 is a side view illustrating a state where a cover 42 is opened.

FIG. 45 is a side view illustrating a rear end of the power extraction device 30. As illustrated in FIGS. 44 and 45, the connecting portion 32 includes a protruding portion 41, and a cover 42 provided below the protruding portion 41. A drawing hole 57 is formed in the cover 42. FIG. 46 is a side view illustrating a state where the cover 42 is opened, and FIG. 47 is a perspective view illustrating the power extraction device 30 in a state where the cover 42 is opened.

Figure 47:
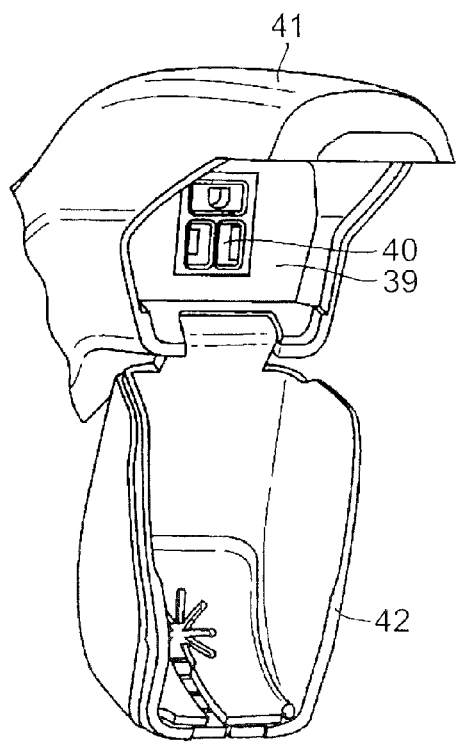
FIG. 47 is a perspective view illustrating the power extraction device 30 in a state where the cover 42 is opened.
Figure 48:
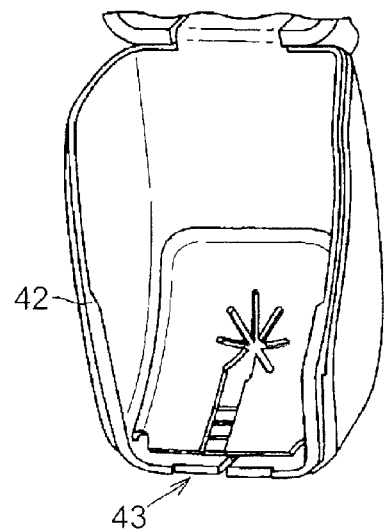
FIG. 48 is a perspective view illustrating an inner surface of the cover 42 in a state where the cover 42 is opened.

When the cover 42 is opened as illustrated in FIG. 46, the connection surface 40 and the end surface 39 are exposed outside as illustrated in FIG. 47. FIG. 48 is a perspective view illustrating an inner surface of the cover 42 in a state where the cover 42 is opened. As illustrated in FIG. 48, a seal 43 is provided in the inner surface of the cover 42.

Figure 49:
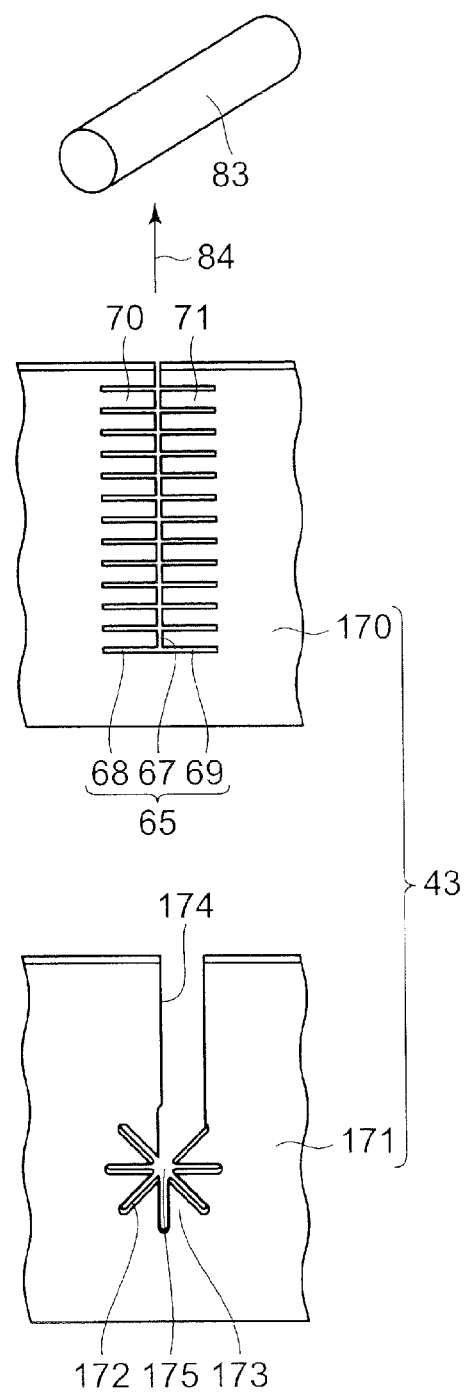

FIG. 49 is a schematic view schematically illustrating the seal 43 and so on. The seal 43 includes a seal piece 170 and a seal piece 171. Note that the seal piece 170 is provided on an inner peripheral surface of the cover 42, and is placed so as to close the drawing hole 57 as illustrated in FIG. 45. The seal piece 171 is placed closer to the end surface 39 than the seal piece 170. A slit portion 65 is formed in the piece portion 170. The slit portion 65 includes a slit portion 67 extending in a closing direction 84, and a plurality of slit portions 68 and a plurality of slit portions 69 extending in a direction intersecting with the slit portion 67.

Hereby, a plurality of piece portions 70 and a plurality of piece portions 71 aligned in the closing direction 84 are formed in the seal piece 170, so that the piece portions 70 and the piece portions 71 are opposed to each other.

In the seal piece 171, a plurality of slit portions 172 extending radially around a central hole 175, a notch portion 174 extending in the closing direction 84, and a plurality of piece portions 173 are formed. The piece portions 173 are arranged circumferentially. Here, the notch portion 174 extends from the central hole 175 in the closing direction 84, so that a cord 83 is receivable therein. In FIG. 46, the connecting portion 31 is connected to a charging portion of a vehicle 10. Then, an electric plug 82 is connected to the connection surface 40 of the body portion 34. After that, the cover 42 is closed by being rotated in the closing direction 84.

In FIG. 49, when the cover 42 is rotated in the closing direction 84, the seal piece 170 and the seal piece 171 are also displaced in the closing direction 84. The cord 83 passes through the slit portion 67, and through the seal piece 170. Further, the cord 83 passes through the notch portion 174, and through the seal piece 171.

At this time, the piece portions 70 and the piece portions 71 are deformed by the cord 83, and the piece portions 173 are also deformed by the cord 83. Here, when the piece portions 70 and the piece portions 71 are deformed, a gap is formed by the cord 83, the piece portions 70, and the piece portions 71. The gap is covered with the piece portions 173, thereby making it possible to restrain external rain water or the like foreign matters from coming inside the cover 42.

Note that, in the present embodiment, the seal piece 171 is placed inside the seal piece 170, but the seal piece 171 may be placed on the inner peripheral surface of the cover 42, so that the seal piece 170 is placed inside the seal piece 171.

It should be considered that the embodiments described herein are just examples in all respects and are not limitative. A scope of the present invention is shown by Claims, not by the descriptions of the above embodiments, and intended to include every modification made within the meaning and scope equivalent to Claims.

INDUSTRIAL APPLICABILITY

The present invention is applicable to an extraction device.

EXPLANATIONS OF LETTERS OR NUMERALS

1 . . . engine, 2 . . . power distribution mechanism, 3 . . . front wheel, 4 . . . converter, 5, 6 . . . inverter, 8 . . . switching element, 9 . . . transducer, 11 . . . body, 12 . . . top surface, 13 . . . bottom surface, 14 . . . peripheral surface, 15, 16 . . . side surface, 17 . . . front surface, 18 . . . back surface, 20 . . . fuel filling portion, 20a . . . nozzle insertion portion, 20b, 21b . . . cover portion, 21 . . . charging portion, 21a . . . charging connector, 22, 25 . . . entrance opening portion, 23, 24, 26, 27 . . . door, 91 . . . external power supply, 93 . . . charging plug.

The invention claimed is:

1. An extraction device configured to connect to a first connecting portion of the vehicle, the vehicle including a storage battery and the first connecting portion, the extraction device comprising:

a second connecting portion connected to the first connecting portion provided on a peripheral surface of the vehicle;

a third connecting portion to which an electric plug of an external device is connectable; and a body portion, the second connecting portion and the third connecting portion being provided on the body portion, wherein:

the third connecting portion includes a connection surface having a terminal hole in which a terminal of the electric plug is inserted;

in a state where the extraction device is connected to the first connecting portion, a normal line of the connection surface that extends outwardly from the connection surface slopes downward relative to a horizontal direction that is parallel to a bottom surface of a body of the vehicle;

the third connecting portion is connected to the first connecting portion via the second connecting portion.

2. The extraction device according to claim 1, wherein:
the second connecting portion is connected to the first connecting portion provided on the peripheral surface of the vehicle.

3. The extraction device according to claim 1, wherein:
in a state where the extraction device is connected to the first connecting portion, a plane extending along the connection surface and a plane extending along the second connecting portion intersect with each other.

4. The extraction device according to claim 1, wherein:
the electric plug is an external connection plug configured to connect the external device to the extraction device.

5. The extraction device according to claim 1, further comprising:
a cover configured to cover the connection surface when the cover is fixed to the extraction device.

6. The extraction device according to claim 5, wherein:
in a state where the cover is not fixed to a protruding portion of the extraction device, an opening through which the electric plug is inserted is provided.

7. The extraction device according to claim 5, wherein:
in a state where the cover is fixed to the extraction device, a drawing hole from which a cord of the electric plug is drawn is provided by the cover and the extraction device.

8. The extraction device according to claim 5, wherein:
in a state where the cover is fixed to the extraction device, a hole is provided on a bottom surface of the cover.

9. The extraction device according to claim 1, further comprising:
a protruding portion provided in a shape of eaves above the connection surface.

10. The extraction device according to claim 5, wherein:
the cover is provided rotatably around a shaft portion placed below the connection surface.

11. The extraction device according to claim 5, wherein:
the cover includes an engagement portion engaged with the extraction device.

12. The extraction device according to claim 5, further comprising:
a seal configured to sandwich a cord of the electric plug connected to the connection surface in a state where the cover is fixed to the extraction device.

13. An extraction device configured to connect to a first connecting portion of a vehicle, the vehicle including a storage battery and the first connecting portion, the extraction device comprising:

a body portion including a second connecting portion connected to the first connecting portion provided on a peripheral surface of the vehicle, and a third connecting portion to which an electric plug of an external device is connectable; and a cover provided on the body portion, wherein:

the third connecting portion has a terminal hole configured to receive a terminal of the electric plug, and a protruding portion provided in a shape of eaves, the protruding portion is provided above the terminal hole and extends from the body portion in a state where the second connecting portion is connected to the first connecting portion;

in a state where the cover is fixed to the protruding portion, the cover and the protruding portion define a storage space configured to store the electric plug when the terminal is inserted into the terminal hole; and the protruding portion and the cover being configured to entirely enclose the electric plug.

14. The extraction device according to claim 13, wherein: the protruding portion is provided integrally with the body portion.

15. The extraction device according to claim 13, wherein: one of the third connecting portion and the cover includes a seal;

a drawing hole from which a cord of the electric plug is drawn is defined by the third connecting portion and the cover fixed to the body portion; and in a state where the cover is fixed to the body portion, the seal contacts the cord drawn out from the drawing hole.

16. The extraction device according to claim 15, wherein: the cover is detachably fixed to the protruding portion; the seal includes a first seal piece; and the first seal piece includes a first slit extending in a closing direction so as to reach an edge of the first seal piece, and a second slit extending from the first slit in a direction intersecting with the closing direction.

17. The extraction device according to claim 16, wherein: the seal includes a second seal piece; and the second seal piece has a central hole, a plurality of third slits extending radially from the central hole, and a notch portion extending from the central hole in the closing direction to reach an edge of the second seal piece.

18. The extraction device according to claim 15, wherein: the cover is detachably fixed to the protruding portion;

the seal includes a first seal piece provided on an inner peripheral surface of the cover so as to be adjacent to the drawing hole, and a second seal piece placed closer to the terminal hole than the first seal piece;

the first seal piece has a central hole, a plurality of third slits extending radially from the central hole, and a notch portion extending from the central hole in a closing direction to reach an edge of the first seal piece; and the second seal piece has a first slit extending in the closing direction so as to reach an edge of the second seal piece, and second slits extending from the first slit in a direction intersecting with the closing direction.

19. The extraction device according to claim 13, wherein: a window portion, through which the terminal hole is observable from outside the protruding portion, is provided to the protruding portion.

20. The extraction device according to claim 13, wherein: the cover has a scupper hole; and the scupper hole is provided to a bottom part of the cover in a state where the cover is fixed to the body portion so as to define the storage space.

21. The extraction device according to claim 20, wherein: in a state where the cover is fixed to the body portion so as to define the storage space, the terminal hole is provided at a position distanced from a virtual line extending from the scupper hole in a direction where the scupper hole extends.

22. The extraction device according to claim 13, wherein: a drawing hole from which a cord of the electric plug is drawn is provided by the protruding portion, and the cover fixed to the body portion so as to define the storage space; and the extraction device further includes a wall portion to separate the drawing hole from the terminal hole.

23. The extraction device according to claim 13, wherein: in a state where the second connecting portion is connected to the first connecting portion, the terminal hole is opened downward relative to a horizontal direction.

24. The extraction device according to claim 13, wherein: the cover is provided detachably from the body portion.

25. An extraction device configured to connect to a first connecting portion of the vehicle, the vehicle including a storage battery and the first connecting portion, the extraction device comprising:

a body portion including a second connecting portion connected to the first connecting portion provided on a peripheral surface of the vehicle, and a third connecting portion to which an electric plug of an external device is connectable;

a cover provided on the body portion; and a seal, wherein:

the third connecting portion has a terminal hole configured to receive a terminal of the electric plug and a protruding portion that extends from the body portion;

in a state where the cover is fixed to the protruding portion, the cover and the protruding portion define a storage space configured to store the electric plug when the terminal is inserted into the terminal hole, the cover being configured to entirely enclose the electric plug;

when the cover is fixed to the protruding portion, a drawing hole from which a cord connected to the electric plug stored in the storage space is drawn is defined;

in a state where the cover is fixed to the protruding portion, the seal contacts the cord;

the seal is provided on the cover.

26. The extraction device according to claim 25, wherein: the cover is detachably fixed to the protruding portion; and when the cover is moved in an opening direction from a state where the cover is fixed to the body portion, an opening through which the electric plug is insertable is defined.

27. The extraction device according to claim 25, wherein: in a state where the cover is fixed to the body portion, the seal contacts the cord so as to restrain external foreign substances from coming inside the storage space.

28. The extraction device according to claim 25, wherein: the cover is detachably fixed to the protruding portion;

when the cover is moved in an opening direction from a state where the cover is fixed to the body portion, an opening through which the electric plug can be inserted is defined; and the seal includes at least one notch extending in a closing direction to reach an edge of the seal.

29. The extraction device according to claim 28, wherein:

the seal includes a first seal piece that is provided with a first notch;

the first notch is a first slit extending in the closing direction so as to reach an edge of the first seal piece; and the first seal piece includes a second slit extending from the first slit in a direction intersecting with the closing direction.

30. The extraction device according to claim 29, wherein:

the seal includes a second seal piece that is provided with a second notch;

the second seal piece has a central hole, and a plurality of third slits extending radially from the central hole; and the second notch extends from the central hole in the closing direction so as to reach an edge of the second seal piece.

31. The extraction device according to claim 28, wherein:

the seal includes a first seal piece placed in the cover in a state where the cover is closed, and a second seal piece placed closer to the drawing hole than the first seal piece;

the notch provided to the first seal piece is a first slit extending in the closing direction so as to reach an edge of the first seal piece, and the first seal piece has a second slit extending from the first slit in a direction intersecting with the closing direction; and the second seal piece has a central hole, and a plurality of third slits extending radially from the central hole, and the notch provided to in the second seal piece is a notch portion extending from the central hole in the closing direction so as to reach an edge of the second seal piece.

32. The extraction device according to claim 25, wherein: the seal is provided inside the drawing hole.

33. The extraction device according to claim 1, wherein the third connecting portion further comprises a protruding portion that slopes downward relative to a horizontal plane that is parallel to a bottom surface of a body of the vehicle in a state where the extraction device is connected to the first connecting portion.

* * * * *